United States Patent
Yamaguchi et al.

(10) Patent No.: US 11,679,990 B2
(45) Date of Patent: Jun. 20, 2023

(54) METHOD FOR PRODUCING DISPERSION OF IRON-CONTAINING RUTILE TITANIUM OXIDE FINE PARTICLES, IRON-CONTAINING RUTILE TITANIUM OXIDE FINE PARTICLES, AND USE THEREOF

(71) Applicant: JGC Catalysts and Chemicals Ltd., Kawasaki (JP)

(72) Inventors: Jun Yamaguchi, Kitakyushu (JP); Takumi Miyazaki, Kitakyushu (JP); Ryo Muraguchi, Kitakyushu (JP); Tatsuya Uehara, Kitakyushu (JP)

(73) Assignee: JGC Catalysts and Chemicals Ltd., Kawasaki (JP)

( * ) Notice: Subject to any disclaimer, the term of this patent is extended or adjusted under 35 U.S.C. 154(b) by 947 days.

(21) Appl. No.: 16/494,355
(22) PCT Filed: Mar. 27, 2018
(86) PCT No.: PCT/JP2018/012287
§ 371 (c)(1),
(2) Date: Sep. 16, 2019
(87) PCT Pub. No.: WO2018/181241
PCT Pub. Date: Oct. 4, 2018

(65) Prior Publication Data
US 2020/0087162 A1 Mar. 19, 2020

(30) Foreign Application Priority Data
Mar. 31, 2017 (JP) .............................. JP2017-072658

(51) Int. Cl.
*C01G 23/053* (2006.01)
*C09D 7/62* (2018.01)
*C09C 1/36* (2006.01)
(52) U.S. Cl.
CPC .......... *C01G 23/053* (2013.01); *C09C 1/3653* (2013.01); *C09D 7/62* (2018.01);
(Continued)

(58) Field of Classification Search
CPC ........ C01G 23/053; C09D 7/62; C09C 1/3653
See application file for complete search history.

(56) References Cited

U.S. PATENT DOCUMENTS

| 6,858,294 B1 | 2/2005 | Tanaka et al. |
| 7,431,903 B2 | 10/2008 | Koyanagi et al. |

(Continued)

FOREIGN PATENT DOCUMENTS

| CN | 1599697 A | 3/2005 |
| CN | 101595059 A | 12/2009 |

(Continued)

*Primary Examiner* — James A Fiorito
(74) *Attorney, Agent, or Firm* — The Webb Law Firm

(57) ABSTRACT

Provided are titanium oxide fine particles which are excellent in transparency and are less photocatalytically active while maintaining a high refractive index, a dispersion of such fine particles, and a method for producing such a dispersion. The method for producing a dispersion of iron-containing rutile titanium oxide fine particles including a step (1) of neutralizing an aqueous metal mineral acid salt solution containing Ti and Fe in $Fe_2O_3/(TiO_2+Fe_2O_3)=0.001$ to 0.010 to form an iron-containing hydrous titanic acid; a step (2) of adding an aqueous hydrogen peroxide solution to form an aqueous solution of iron-containing peroxotitanic acid having an average particle size of 15 to 50 nm; a step (3) of adding a tin compound so as to satisfy $TiO_2/SnO_2=6$ to 16; a step (4) of adding a sol of silica-based fine particles which contain Si and a metal element M in $SiO_2/MO_{x/2}=99.9/0.1$ to 80/20, the addition being made so as to satisfy $SiO_2/(\text{oxides of the other elements})=0.08$ to $0.22$; and a step (5) of hydrothermally treating the solution obtained in the step (4).

5 Claims, 1 Drawing Sheet

(52) U.S. Cl.
CPC ...... *C01P 2002/70* (2013.01); *C01P 2004/03* (2013.01); *C01P 2004/64* (2013.01); *C01P 2006/60* (2013.01)

(56) References Cited

U.S. PATENT DOCUMENTS

| | | |
|---|---|---|
| 8,557,217 B2 | 10/2013 | Kim et al. |
| 8,748,001 B2 | 6/2014 | Muraguchi et al. |
| 8,986,580 B2 | 3/2015 | Furudate et al. |
| 8,986,742 B2 | 3/2015 | Nakamura et al. |
| 9,382,128 B2 | 7/2016 | Edwards et al. |
| 9,463,436 B2 | 10/2016 | Furudate et al. |
| 2004/0265587 A1 | 12/2004 | Koyanagi et al. |
| 2009/0061183 A1 | 3/2009 | Muraguchi et al. |
| 2010/0221556 A1 | 9/2010 | Koyama et al. |
| 2010/0226851 A1 | 9/2010 | Kim et al. |
| 2010/0239872 A1 | 9/2010 | Koyama et al. |
| 2012/0065312 A1 | 3/2012 | Ishihara et al. |
| 2012/0165186 A1 | 6/2012 | Edwards et al. |
| 2012/0214667 A1 | 8/2012 | Furudate et al. |
| 2014/0100105 A1 | 4/2014 | Furudate et al. |
| 2014/0112965 A1 | 4/2014 | Nakamura et al. |
| 2014/0285897 A1 | 9/2014 | Koyama et al. |
| 2015/0299417 A1 | 10/2015 | Masuda et al. |

FOREIGN PATENT DOCUMENTS

| | | |
|---|---|---|
| CN | 101815675 A | 8/2010 |
| CN | 101815676 A | 8/2010 |
| CN | 103562135 A | 2/2014 |
| CN | 105017841 A | 11/2015 |
| JP | S63123807 A | 5/1988 |
| JP | H02255532 A | 10/1990 |
| JP | H05330825 A | 12/1993 |
| JP | H11-172152 A | 6/1999 |
| JP | 2000204301 A | 7/2000 |
| JP | 200956387 A | 3/2009 |
| JP | 2009155496 A | 7/2009 |
| JP | 2009197078 A | 9/2009 |
| JP | 2010168266 A | 8/2010 |
| JP | 2011132484 A | 7/2011 |
| JP | 2011240247 A | 12/2011 |
| JP | 2014084251 A | 5/2014 |
| KR | 1020070108122 A | 11/2007 |
| TW | 201119947 A1 | 6/2011 |

METHOD FOR PRODUCING DISPERSION OF IRON-CONTAINING RUTILE TITANIUM OXIDE FINE PARTICLES, IRON-CONTAINING RUTILE TITANIUM OXIDE FINE PARTICLES, AND USE THEREOF

CROSS-REFERENCE TO RELATED APPLICATIONS

This application is the United States national phase of International Application No. PCT/JP2018/012287 filed Mar. 27, 2018, and claims priority to Japanese Patent Application No. 2017-072658 filed Mar. 31, 2017, the disclosures of which are hereby incorporated by reference in their entirety.

TECHNICAL FIELD

The present invention relates to a method for producing a dispersion of titanium oxide fine particles, more particularly, to a method for producing a dispersion of titanium oxide fine particles suitably used as, for example, a material of a coating liquid for forming a coating film on a plastic substrate.

BACKGROUND ART

Titanium oxide fine particles have a high refractive index and are suitably used as a material of a coating liquid for forming a coating film on an optical substrate such as a plastic lens. In particular, rutile crystalline titanium oxide fine particles show lower photocatalytic activity than the anatase type and thus give rise to a smaller reduction in the adhesion of the coating film with respect to a substrate stemming from the decomposition of organosilicon compounds or resin components forming the coating film.

Regarding the production of a dispersion of rutile crystalline titanium oxide fine particles, for example, Japanese patent JP-A-H02-255532 describes that a dispersion of rutile titanium oxide fine particles is obtained by adding hydrogen peroxide to a gel or sol of hydrous titanium oxide to dissolve the hydrous titanium oxide, and heating the solution in the presence of a tin compound in an amount of $TiO_2/SnO_2=1.5$ to 14 (by weight). It is also described that the dispersion stability may be enhanced by obtaining the sol in such a manner that the aqueous solution resulting from the mixing of the aqueous titanic acid solution and the tin compound is further heated and hydrolyzed in the presence of a silicon compound.

Japanese patent document JP-H11-172152 pertains to a coating liquid for forming a hard coating film having high refractive index, excellent transparency, excellent weather resistance and excellent adhesion with a substrate. It is disclosed therein that the coating liquid contains composite oxide fine particles including a titanium oxide component and an iron oxide component in $Fe_2O_3/TiO_2$ (by weight) of not less than 0.0005 and less than 0.005. Patent Literature 2 discloses a method for producing composite titanium oxide/iron oxide particles. Composite anatase titanium oxide/iron oxide fine particles obtained by the production method are less photocatalytically active, and a coating liquid containing such composite oxide fine particles can give coating films with outstanding weather resistance.

Japanese patent document JP-A-2000-204301 discloses core-shell fine particles in which rutile titanium oxide fine particles as cores are coated with a composite oxide formed of silicon oxide and oxide of zirconium and/or aluminum. This configuration weakens the photocatalytic activity of the rutile titanium oxide fine particles, and a coating liquid containing such core-shell fine particles can give coating films with outstanding weather resistance.

The conventional titanium oxide fine particles are required to be enhanced in weather resistance and light resistance while maintaining their high refractive index.

It is therefore an object of the present invention to provide titanium oxide fine particles which are excellent in transparency and are less photocatalytically active while maintaining a high refractive index. Other objects of the present invention include to provide a dispersion of such fine particles, and to provide a method for producing such a dispersion.

SUMMARY OF THE INVENTION

The present inventors carried out extensive studies and have found that the above problem may be solved by allowing titanium oxide fine particles to contain a slight amount of iron and to have the rutile structure, thereby completing the present invention. A summary of the present invention is as described below.

[1]

A method for producing a dispersion of iron-containing rutile titanium oxide fine particles, including:

a step (1) of neutralizing an aqueous metal mineral acid salt solution containing Ti and Fe as metals to form an iron-containing hydrous titanic acid, the masses of the metals in the aqueous solution in terms of oxide being such that mass of $Fe_2O_3$/(total mass of $TiO_2$ and $Fe_2O_3$)=0.001 to 0.010;

a step (2) of adding an aqueous hydrogen peroxide solution to the iron-containing hydrous titanic acid obtained in the step (1) to form an aqueous solution of iron-containing peroxotitanic acid having an average particle size of 15 to 50 nm;

a step (3) of adding a tin compound to the aqueous solution of iron-containing peroxotitanic acid obtained in the step (2) in such an amount that the masses of Sn and Ti in the aqueous solution in terms of oxide satisfy mass of $TiO_2$/mass of $SnO_2=6$ to 16;

a step (4) of adding a sol of silica-based fine particles to the solution obtained in the step (3), the silica-based fine particles containing Si and at least one metal element (M) selected from the group consisting of Al, Zr, Sb, Zn, Ni, Ba, Mg and V in such amounts that the masses thereof in terms of oxide satisfy mass of $SiO_2$/mass of $MO_{x/2}$ (x is the valence of M)=99.9/0.1 to 80/20, the addition being made so that the masses in terms of oxide of the metal elements in the solution obtained in the step (3) and the masses in terms of oxide of the silicon and the metal element or elements in the sol satisfy mass of $SiO_2$/(total mass of $TiO_2$, $SnO_2$, $Fe_2O_3$, $SiO_2$ and $MO_{x/2}$)=0.08 to 0.22; and a step (5) of hydrothermally treating the solution obtained in the step (4) to produce a dispersion of iron-containing rutile titanium oxide fine particles.

[2]

The method for producing a dispersion of iron-containing rutile titanium oxide fine particles of the above [1], wherein the specific surface area of the silica-based fine particles is 100 to 600 m²/g.

[3]

Iron-containing rutile titanium oxide fine particles satisfying requirements (a) to (f) below:

(a) the fine particles contain not less than 70 mass % of Ti in terms of $TiO_2$, contain Fe and contain Sn, Si and at least one metal element (M) selected from the group consisting of Al, Zr, Sb, Zn, Ni, Ba, Mg and V;

(b) the mass contents of Fe and Ti in terms of oxide satisfy mass of $Fe_2O_3$/(total mass of $TiO_2$ and $Fe_2O_3$)=0.001 to 0.010;

(c) the mass contents of Ti and Sn in terms of oxide satisfy mass of $TiO_2$/mass of $SnO_2$=6 to 18;

(d) the mass contents of Si and M in terms of oxide satisfy mass of $SiO_2$/mass of $MO_{x/2}$ (x is the valence of M)=99.9/0.1 to 80/20;

(e) the mass contents of Si and the metal elements in terms of oxide satisfy mass of $SiO_2$/(total mass of $TiO_2$, $SnO_2$, $Fe_2O_3$, $SiO_2$ and $MO_{x/2}$ (x is the valence of M))=0.08 to 0.22; and (f) the average particle size is 4 to 25 nm.

[4]

Core-shell iron-containing rutile titanium oxide fine particles each including the iron-containing rutile titanium oxide fine particle of the above [3], and a layer covering the fine particle, the layer comprising an oxide and/or a composite oxide containing Si and at least one metal element selected from the group consisting of Al, Zr and Sb.

[5]

A paint composition including the core-shell iron-containing rutile titanium oxide fine particles of the above [4], and a matrix component.

[6]

A coating film obtained by curing the paint composition of the above [5].

[7]

A coated substrate including a substrate and the coating film of the above [6] disposed on a surface of the substrate.

A

According to the production method of the present invention, titanium oxide fine particles can be produced which have excellent transparency and are less photocatalytically active than the conventional titanium oxide fine particles while maintaining a high refractive index. The invention also provides core-shell fine particles each having the above fine particle as a core particle, dispersions of these fine particles, paint compositions including the fine particles, and methods for producing these products.

Further, coated substrates are also provided which have a hardcoat layer or a UV shield coat layer that is formed from the paint composition and has a high refractive index and suppressed photocatalytic activity.

DETAILED DESCRIPTION OF EMBODIMENTS OF THE INVENTION

Figure 1:
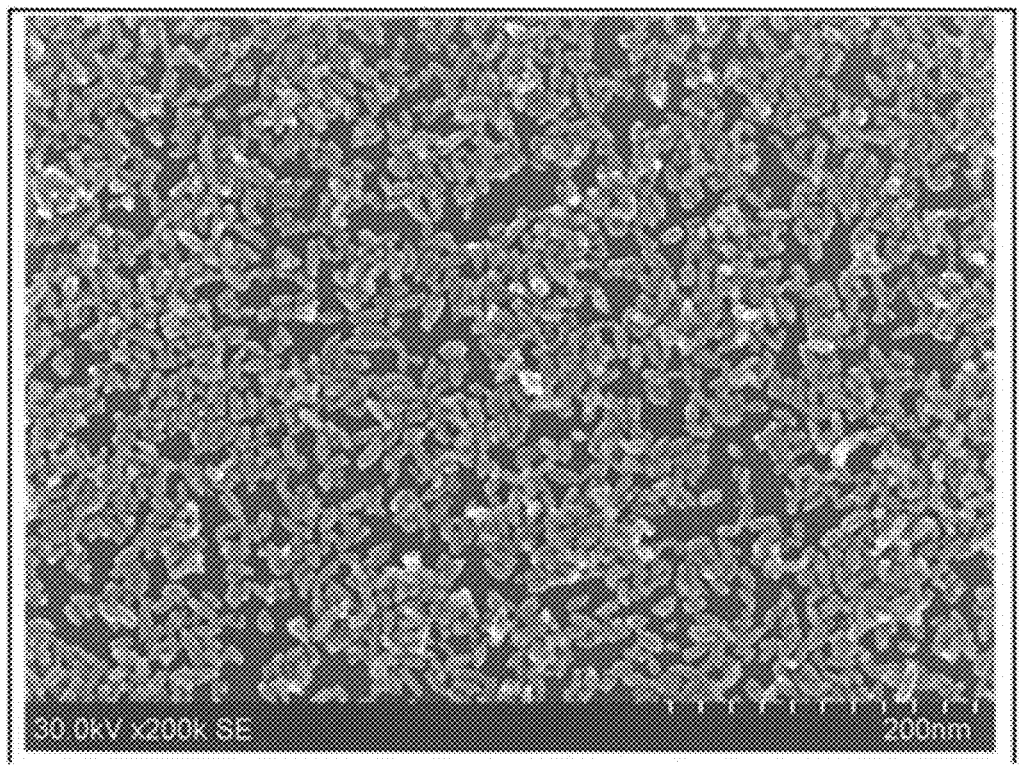
FIG. 1 is a SEM image of titanium oxide fine particles 1A obtained in Example 1.
Figure 2:
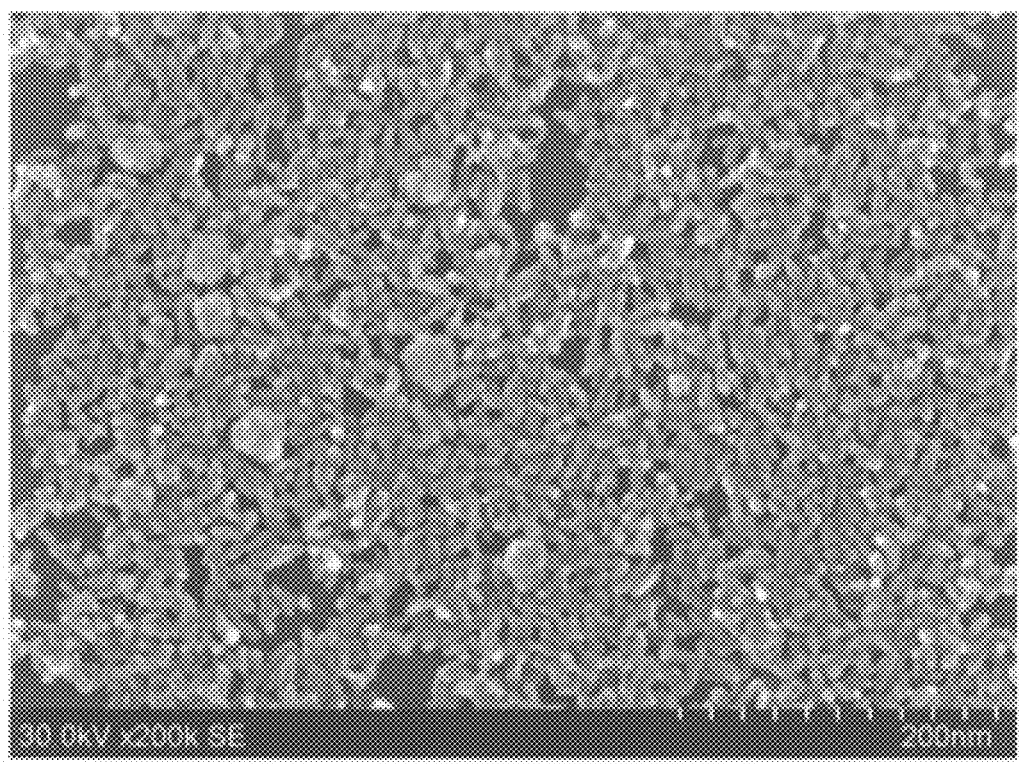
FIG. 2 is a SEM image of titanium oxide fine particles 21A obtained in Comparative Example 11.

The present invention will be described in detail hereinbelow.

[Method for Producing Dispersion of Iron-Containing Rutile Titanium Oxide Fine Particles]

A method of the present invention for producing a dispersion of iron-containing rutile titanium oxide fine particles includes the steps (1) to (5) discussed below.

Step (1)

The step (1) is a step of neutralizing an aqueous metal mineral acid salt solution containing Ti and Fe as metals to form an iron-containing hydrous titanic acid. In the aqueous solution, the masses of the metals in terms of oxide are such that mass of $Fe_2O_3$/(total mass of $TiO_2$ and $Fe_2O_3$) (hereinafter, also written as "$Fe_2O_3$/($TiO_2$+$Fe_2O_3$)")=0.001 to 0.010.

For example, the aqueous solution may be prepared by mixing a titanium mineral acid salt, an iron mineral acid salt and water together, or by mixing a titanium mineral acid salt and an iron mineral acid salt together (with the proviso that one or both of the mineral acid salts are in the form of an aqueous solution).

Examples of the titanium mineral acid salts include, although not limited to, titanium sulfate, titanium nitrate, titanium tetrachloride, titanyl sulfate and titanyl chloride.

Examples of the iron mineral acid salts include, although not limited to, ferric chloride, ferrous sulfate and ferric nitrate.

$Fe_2O_3$/($TiO_2$+$Fe_2O_3$) is 0.001 to 0.010 (i.e., 0.1 to 1.0 mass %), and more preferably 0.003 to 0.0085 (i.e., 0.3 to 0.85 mass %). If the ratio ($Fe_2O_3$/($TiO_2$+$Fe_2O_3$)) is less than 0.001, the photocatalytic activity of the iron-containing rutile titanium oxide fine particles cannot be reduced sufficiently. If the ratio ($Fe_2O_3$/($TiO_2$+$Fe_2O_3$)) is greater than 0.01, the iron-containing rutile titanium oxide fine particles take on a yellow color and make yellow the color of a coating film containing the iron-containing rutile titanium oxide fine particles.

The reasons as to why iron lowers the photocatalytic activity of the titanium oxide fine particles are unclear, but are probably because iron adds an impurity level to the electron energy band of titanium oxide and this impurity level serves as a site of the recombination of excited electrons and holes, thus rendering the titanium oxide less photocatalytically active.

The aqueous metal mineral acid salt solution may be neutralized by being brought into contact with a basic material. Examples of the basic materials include ammonia. The basic material may be used in the form of an aqueous solution (for example, ammonia water).

The neutralization of the aqueous metal mineral acid salt solution gives an iron-containing hydrous titanic acid as a slurry. The iron-containing hydrous titanic acid may be separated from the slurry by, for example, filtering the slurry of the iron-containing hydrous titanic acid. The iron-containing hydrous titanic acid is a hydrous solid resulting from the neutralization of the aqueous metal mineral acid salt solution, and is based on hydrous titanic acid and contains a small amount of iron.

The iron-containing hydrous titanic acid is preferably washed by a medium such as pure water.

Step (2)

The step (2) is a step of adding an aqueous hydrogen peroxide solution to the iron-containing hydrous titanic acid obtained in the step (1) to form an aqueous solution of iron-containing peroxotitanic acid having an average particle size of 15 to 50 nm.

In the step (2), the mixture of the iron-containing hydrous titanic acid and the aqueous hydrogen peroxide solution is preferably stirred at a temperature of 70 to 90° C. The stirring time is preferably 0.5 to 5 hours. Stirring under these conditions peptizes the iron-containing hydrous titanic acid, and therefore the average particle size of the iron-containing peroxotitanic acid in the aqueous solution can be controlled to the range of 15 to 50 nm. Although the liquid that is obtained is a dispersion of the iron-containing peroxotitanic acid particles, the liquid is written as an aqueous solution, not an aqueous dispersion. The iron-containing peroxotitanic acid is based on peroxotitanic acid and contains a small amount of iron which probably substitutes for part of titanium in the peroxotitanic acid.

The heating to 70 to 90° C. is desirably started immediately after the addition of the aqueous hydrogen peroxide solution to the iron-containing hydrous titanic acid, specifically, within 2 hours, and preferably within 1 hour after the addition. By such immediate heating to 70 to 90° C., the iron-containing peroxotitanic acid attains small particle sizes.

The average particle size of the peptized iron-containing peroxotitanic acid is 15 to 50 nm, and preferably 30 to 45 nm as measured by the method described later in Examples or a method that is equivalent thereto. By controlling the average particle size of the peptized iron-containing peroxotitanic acid to the above range, the final iron-containing rutile titanium oxide fine particles attain an average particle size of 4 to 25 nm, and a highly transparent dispersion of the fine particles may be obtained stably.

If the average particle size of the iron-containing peroxotitanic acid is less than 15 nm, the iron-containing peroxotitanic acid exhibits so low dispersion stability in the aqueous solution that the final iron-containing rutile titanium oxide fine particles contain coarse particles which can deteriorate the transparency of the dispersion. If the average particle size is greater than 50 nm, the iron-containing rutile titanium oxide fine particles become so large in diameter that the transparency of the dispersion may be lowered.

The aqueous hydrogen peroxide solution is preferably added in such an amount that the mass ratio of hydrogen peroxide to titanium (in terms of oxide) in the iron-containing hydrous titanic acid satisfies mass of $H_2O_2$/mass of $TiO_2$=2 to 8. When the amount of the aqueous hydrogen peroxide solution is in this range, the iron-containing peroxotitanic acid will not be excessively small in particle size and will exhibit excellent dispersion stability in the aqueous solution.

The aqueous solution of iron-containing peroxotitanic acid is preferably adjusted to a titanium concentration in terms of $TiO_2$ of not more than 5 mass %, and more preferably not more than 2 mass %. When the titanium concentration (in terms of $TiO_2$) is in this range, the iron-containing peroxotitanic acid particles are less likely to aggregate and consequently the average particle size of the iron-containing rutile titanium oxide fine particles can be rendered small.

Step (3)

The step (3) is a step of adding a tin compound to the aqueous solution of iron-containing peroxotitanic acid obtained in the step (2) in such an amount that the masses of Sn and Ti in the aqueous solution in terms of oxide satisfy mass of $TiO_2$/mass of $SnO_2$ (hereinafter, also written as "$TiO_2$/$SnO_2$")=6 to 16.

Examples of the tin compounds include, although not limited to, potassium stannate, tin nitrate and tin chloride.

If $TiO_2$/$SnO_2$ is less than 6, the weather resistance of the iron-containing rutile titanium oxide fine particles is lowered. If $TiO_2$/$SnO_2$ is more than 16, anatase crystals are formed in the iron-containing rutile titanium oxide fine particles.

If foreign ions are present in the aqueous solution obtained in the step (3), the next step (4) may fail to give the desired particles. It is therefore preferable that such foreign ions be removed in the step (3). For example, the foreign ions may be removed by, although not limited to, using an ion exchange resin or an ultrafiltration membrane.

Step (4)

The step (4) is a step of adding a sol of silica-based fine particles to the solution obtained in the step (3). The silica-based fine particles contain Si and at least one metal element (M) selected from the group consisting of Al, Zr, Sb, Zn, Ni, Ba, Mg and V in such amounts that the masses thereof in terms of oxide satisfy mass of $SiO_2$/mass of $MO_{x/2}$ (x is the valence of M) (hereinafter, also written as "$SiO_2$/$MO_{x/2}$")=99.9/0.1 to 80/20. The addition is made so that the masses in terms of oxide of the metal elements in the solution obtained in the step (3) and the masses in terms of oxide of the silicon and the metal element or elements in the sol satisfy mass of $SiO_2$/(total mass of $TiO_2$, $SnO_2$, $Fe_2O_3$, $SiO_2$ and $MO_{x/2}$) (hereinafter, also written as "$SiO_2$/($TiO_2$+$SnO_2$+$Fe_2O_3$+$SiO_2$+$MO_{x/2}$)")=0.08 to 0.22 (i.e., 8 to 22 mass %).

The sol of the silica-based fine particles may be produced by a known method, for example, the method described in JP-A-S63-123807 or the method described in JP-A-2009-197078.

Although the reasons are unclear, the addition of the sol of the silica-based fine particles allows the final iron-containing rutile titanium oxide fine particles to be stably dispersed in the dispersion without being sedimented or precipitated, prevents the fine particles from being aggregated or coarsened, and makes it possible to control the particle size and grain size distribution of the fine particles in the dispersion.

If the sol of the silica-based fine particles is not added, the final iron-containing rutile titanium oxide fine particles in the dispersion are not controlled in particle size and exhibit poor dispersion stability. If the sol of the silica-based fine particles is replaced by a sol of silica fine particles containing no metal elements M, the dispersion of the final iron-containing rutile titanium oxide fine particles may contain coarse particles or particle aggregates.

$SiO_2$/$MO_{x/2}$ is 99.9/0.1 to 80/20, and preferably 99.9/0.1 to 82/18. If $SiO_2$/$MO_{x/2}$ in the silica-based fine particles is larger than 99.9/0.1, the fine particles tend to show poor dispersion stability in the aqueous solution of the iron-containing peroxotitanic acid particles. If $SiO_2$/$MO_{x/2}$ is less than 80.0/20.0, the silica-based fine particles tend to show low solubility into the aqueous solution of the iron-containing peroxotitanic acid particles during hydrothermal treatment.

The letter x indicates the valence of the metal element M. The present invention assumes that the valences of Al, Zr, Sb, Zn, Ni, Ba, Mg and V are III, IV, III, II, II, II, II and V, respectively.

The sol of the silica-based fine particles is added so that $SiO_2$/($TiO_2$+$SnO_2$+$Fe_2O_3$+$SiO_2$+$MO_{x/2}$)=0.08 to 0.22 (i.e., 8 to 22 mass %), and preferably 12 to 20. If $SiO_2$/($TiO_2$+$SnO_2$+$Fe_2O_3$+$SiO_2$+$MO_{x/2}$) is less than 8 mass %, the iron-containing rutile titanium oxide fine particles tend to fail to attain sufficiently low photocatalytic activity. If $SiO_2$/($TiO_2$+$SnO_2$+$Fe_2O_3$+$SiO_2$+$MO_{x/2}$) is above 22 mass %, the silica-based fine particles are hardly dissolved during hydrothermal treatment and the sol of the silica-based fine particles tends to fail to produce sufficient effects.

The specific surface area of the silica-based fine particles is preferably 100 to 600 $m^2$/g, more preferably 200 to 550 $m^2$/g, and still more preferably 300 to 550 $m^2$/g. This specific surface area of the silica-based fine particles ensures that the addition of the sol of the silica-based fine particles will produce sufficient effects.

Step (5)

The step (5) is a step of hydrothermally treating the solution obtained in the step (4) to produce a dispersion of iron-containing rutile titanium oxide fine particles.

The hydrothermal treatment conditions may be appropriately adopted from the conventional conditions under which a titanium oxide fine particle dispersion is produced by hydrothermal treatment. The temperature is preferably 100 to 300° C., and the amount of time is preferably 5 to 40 hours. The hydrothermal treatment under these conditions gives a dispersion of iron-containing rutile titanium oxide fine particles with excellent dispersibility. In the step (5), the dispersion is obtained as an aqueous dispersion.

(Dispersion of Iron-Containing Rutile Titanium Oxide Fine Particles)

A dispersion of iron-containing rutile titanium oxide fine particles obtained by the production method of the present invention may be concentrated appropriately by a known technique such as distillation under reduced pressure, or ultrafiltration, depending on use application.

The dispersion of iron-containing rutile titanium oxide fine particles may be an aqueous dispersion, a dispersion in water and an organic solvent, or a dispersion in an organic solvent. A dispersion including an organic solvent as the dispersion medium may be produced by, for example, substituting part or the whole of water in an aqueous dispersion with an organic solvent by a known technique such as a rotary evaporator or an ultrafiltration membrane.

Examples of the organic solvents will be described later.

[Iron-Containing Rutile Titanium Oxide Fine Particles]

Iron-containing rutile titanium oxide fine particles according to the present invention satisfy the requirements (a) to (f) below:

(a) The fine particles contain not less than 70 mass % of Ti in terms of $TiO_2$, contain Fe and contain Sn, Si and at least one metal element (M) selected from the group consisting of Al, Zr, Sb, Zn, Ni, Ba, Mg and V.

(b) The mass contents of Fe and Ti in terms of oxide satisfy mass of $Fe_2O_3$/(total mass of $TiO_2$ and $Fe_2O_3$)=0.001 to 0.010.

(c) The mass contents of Ti and Sn in terms of oxide satisfy mass of $TiO_2$/mass of $SnO_2$=6 to 18 (the upper limit may be 16).

(d) The mass contents of Si and M in terms of oxide satisfy mass of $SiO_2$/mass of $MO_{x/2}$ (x is the valence of M)=99.9/0.1 to 80/20.

(e) The mass contents of Si and the metal elements in terms of oxide satisfy mass of $SiO_2$/(total mass of $TiO_2$, $SnO_2$, $Fe_2O_3$, $SiO_2$ and $MO_{x/2}$ (x is the valence of M))=0.08 to 0.22.

(f) The average particle size is 4 to 25 nm, and preferably 12 to 25 nm as measured by the method described later in Examples or a method that is equivalent thereto.

The "iron-containing rutile titanium oxide fine particles" are fine particles which are identified to have a rutile titanium oxide crystal structure by XRD measurement or the like, and which contain silicon and metal elements other than titanium (iron, tin, metal elements M described hereinabove). Part of the titanium sites in the rutile titanium oxide are probably replaced by all or part of silicon and the metal elements other than titanium.

The iron-containing rutile titanium oxide fine particles are less photocatalytically active than the conventional titanium oxide fine particles, and still maintain a high refractive index.

The iron-containing rutile titanium oxide fine particles have high shape uniformity. The fine particles may be confirmed to be of high shape uniformity by observing the fine particles with a scanning electron microscope (SEM). Thus, the iron-containing rutile titanium oxide fine particles are also excellent in transparency.

$Fe_2O_3$/($TiO_2$+$Fe_2O_3$) is 0.001 to 0.010 (i.e., 0.1 to 1.0 mass %), and preferably 0.003 to 0.0085 (i.e., 0.3 to 0.85 mass %). If $Fe_2O_3$/($TiO_2$+$Fe_2O_3$) is less than 0.001, the photocatalytic activity of the iron-containing rutile titanium oxide fine particles is not sufficiently low. If $Fe_2O_3$/($TiO_2$+$Fe_2O_3$) is more than 0.01, the iron-containing rutile titanium oxide fine particles take on a yellow color and make yellow the color of a coating film containing the iron-containing rutile titanium oxide fine particles.

[Core-Shell Iron-Containing Rutile Titanium Oxide Fine Particles]

Core-shell iron-containing rutile titanium oxide fine particles according to the present invention each include the iron-containing rutile titanium oxide fine particle of the invention, and a layer covering the fine particle (hereinafter, the layer will be also written as the "coating layer"), the layer comprising an oxide and/or a composite oxide containing Si and at least one metal element selected from the group consisting of Al, Zr and Sb.

The coating layer weakens the photoactivity of the iron-containing rutile titanium oxide fine particles as core particles to a still lower level. For example, the coating layer may be formed by the method described in JP-A-2009-155496.

Specifically, an aqueous solution of a hydroxide, peroxide, alkoxide and/or inorganic salt which each contain Si and at least one metal element selected from the group consisting of Al, Zr and Sb may be gradually added at a temperature of 80° C. to 95° C. to an aqueous dispersion of the iron-containing rutile titanium oxide fine particles of the invention, and, after the completion of the addition, the mixture may be aged for 0.5 to 2 hours and the resultant dispersion may be hydrothermally treated to give an aqueous dispersion of core-shell iron-containing rutile titanium oxide fine particles coated with the coating layer described above.

The amount of the coating layer in the core-shell iron-containing rutile titanium oxide fine particles is preferably 0.5 to 50 parts by mass per 100 parts by mass of the iron-containing rutile titanium oxide fine particles which are the core particles. This amount may be controlled by manipulating the amounts in which the iron-containing rutile titanium oxide fine particles and the raw materials of the coating layer are fed.

The dispersion of the core-shell iron-containing rutile titanium oxide fine particles may be an aqueous dispersion, a dispersion in water and an organic solvent, or a dispersion in an organic solvent. A dispersion including an organic solvent as the dispersion medium may be produced by, for example, substituting part or the whole of water in a dispersion with an organic solvent by a known technique such as a rotary evaporator or an ultrafiltration membrane.

Examples of the organic solvents which may be used in the dispersion of the iron-containing rutile titanium oxide fine particles and in the dispersion of the core-shell iron-containing rutile titanium oxide fine particles include:

alcohols such as methanol, ethanol, 1-propanol, 2-propanol, 1-butanol, 2-butanol and octanol;

esters such as ethyl acetate, butyl acetate, ethyl lactate, propylene glycol monomethyl ether acetate, propylene glycol monoethyl ether acetate and γ-butyrolactone;

ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether and diethylene glycol monoethyl ether;

ketones such as acetone, methyl ethyl ketone, methyl isobutyl ketone, acetylacetone and cyclohexanone;

aromatic hydrocarbons such as benzene, toluene, xylene and ethylbenzene;

cyclic hydrocarbons such as cyclohexane; and amides such as dimethylformamide, N,N-dimethylacetoacetamide and N-methylpyrrolidone. The organic solvents may be used singly, or two or more may be used in combination.

(Surface Treatment of Core-Shell Iron-Containing Rutile Titanium Oxide Fine Particles)

To ensure that the core-shell iron-containing rutile titanium oxide fine particles will be dispersed in an organic solvent or a resin-dispersed solution without being aggregated in the dispersion, the surface of the core-shell iron-containing rutile titanium oxide fine particles may be hydrophobized with a surface treating agent.

This hydrophobization step is a step in which a surface treating agent is added into the dispersion and the mixture is further heated or hydrothermally treated as required. This step may be performed before water in the aqueous dispersion described hereinabove is replaced by a solvent (hereinafter, this operation will be also written as the "solvent replacement"), or may be performed concurrently with or after the solvent replacement. A catalyst such as ammonia may be used in this step as required.

Known surface treating agents may be used, with examples including alkoxide compounds such as tetraethoxysilane and triisopropoxyaluminum, coupling agents such as silane coupling agents and titanium coupling agents, low-molecular or high-molecular surfactants such as nonionic, cationic or anionic surfactants, and metal soap salts such as fatty acid metal salts and naphthenic acid metal salts.

The dispersion of the core-shell iron-containing rutile titanium oxide fine particles in water and/or an organic solvent may be used as a coating liquid for forming coating films, or may be added to a resin composition in accordance with conventionally known methods appropriately.

[Paint Compositions]

A paint composition according to the present invention includes the core-shell iron-containing rutile titanium oxide fine particles of the invention, and a matrix component. The paint composition may further include a curing catalyst or an additive.

The paint composition may be a thermally curable paint composition or a photocurable paint composition.

The thermally curable paint composition includes the core-shell iron-containing rutile titanium oxide fine particles, the matrix component, and optionally a thermal curing catalyst or an additive as required, and may be produced by mixing these components, for example, based on the description in JP-A-2000-204301.

The photocurable paint composition includes the core-shell iron-containing rutile titanium oxide fine particles, the matrix component, and optionally a photocuring catalyst or an additive as required, and may be produced by mixing these components, for example, based on the description in JP-A-2009-56387.

Examples of the matrix components include methyltrimethoxysilane, ethyltriethoxysilane, methyltriethoxysilane, phenyltriethoxysilane, dimethyldimethoxysilane, phenylmethyldimethoxysilane, vinyltrimethoxysilane, vinyltriethoxysilane, vinyltris(β-methoxyethoxy)silane, γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)ethyltrimethoxysilane, γ-methacryloxypropyltrimethoxysilane, N-β(aminoethyl)γ-aminopropyltrimethoxysilane, N-β(aminoethyl)γ-aminopropylmethyldimethoxysilane, γ-aminopropyltriethoxysilane, N-phenyl-γ-aminopropyltrimethoxysilane and γ-mercaptopropyltrimethoxysilane. These may be used singly, or two or more may be used in combination.

Examples of the thermal curing catalysts include amines such as n-butylamine, triethylamine, guanidine and biguanidide, amino acids such as glycine, metal acetylacetonates such as aluminum acetylacetonate, chromium acetylacetonate, titanyl acetylacetonate and cobalt acetylacetonate, organic acid metal salts such as sodium acetate, zinc naphthenate, cobalt naphthenate, zinc octylate and tin octylate, perchloric acid and salts thereof such as perchloric acid, ammonium perchlorate and magnesium perchlorate, acids such as hydrochloric acid, phosphoric acid, nitric acid and p-toluenesulfonic acid, and metal chlorides which are Lewis acids such as $SnCl_2$, $AlCl_3$, $FeCl_3$, $TiCl_4$, $ZnCl_2$ and $SbCl_3$. These may be used singly, or two or more may be used in combination.

Examples of the photocuring catalysts include bis(2,4,6-trimethylbenzoyl)phenylphosphine oxide, bis(2,6-dimethoxybenzoyl)-2,4,4-trimethyl-pentylphosphine oxide, 2-hydroxy-methyl-2-methyl-phenyl-propane-1-ketone, 2,2-dimethoxy-1,2-diphenylethan-1-one, 1-hydroxy-cyclohexyl-phenyl-ketone and 2-methyl-1-[4-(methylthio)phenyl]-2-morpholinopropan-1-one. These may be used singly, or two or more may be used in combination.

Examples of the additives include surfactants, leveling agents, UV absorbers, light stabilizers, diluting solvents, preservatives, antifouling agents, antimicrobial agents, antifoaming agents, UV degradation inhibitors and dyes. These may be used singly, or two or more may be used in combination.

[Coated Substrates]

A coated substrate according to the present invention includes a substrate and a coating film disposed on a surface of the substrate, the coating film being formed from the paint composition of the present invention.

Examples of the substrates include various glass or plastic substrates. Specific examples include plastic substrates used as optical lenses or the like.

The thickness of the coating film may vary depending on the use application of the coated substrate, but is preferably 0.03 to 30 μm.

When the thermally curable paint composition is used, the coated substrate of the invention may be produced based on the description of, for example, JP-A-2000-204301. When the photocurable paint composition is used, the coated substrate may be produced based on the description of, for example, JP-A-2009-56387. The thermally curable paint composition or the photocurable paint composition may be applied onto the substrate by a known technique such as dipping, spraying, spinner coating process, roll coating process or bar coating process, followed by drying, and the coating film may be cured by treatment such as heating or UV irradiation.

During the production of the coated substrate of the present invention, the surface of the substrate may be pretreated, for example, treated with an alkali, an acid or a surfactant, polished with inorganic or organic fine particles, or treated with a primer or plasma, for the purpose of enhancing the adhesion between the substrate, for example, a plastic substrate, and the coating film.

EXAMPLES

The present invention will be described in greater detail based on Examples hereinbelow. However, it should be construed that the scope of the present invention is not limited to such Examples.

[Measurement Methods and Evaluation Methods]

The measurement methods and the evaluation methods used in the following discussion such as Examples will be described below.

[1] Average Particle Size ((Iron-Containing) Peroxotitanic Acid, Inorganic Oxide Fine Particles)

Particles were diluted with a dispersion medium so that the solid concentration would be 3 wt %, and the particle size distribution was measured with a fine particle grain size analyzer (ELS-Z manufactured by OTSUKA ELECTRONICS Co., LTD.) based on a dynamic light scattering method. The refractive index and viscosity of the dispersion medium were used as the refractive index and viscosity of the solution. The average particle size was determined by cumulant analysis.

[2] Specific Surface Area (Silica Fine Particles or Silica-Based Fine Particles)

50 mL of a sol of silica fine particles or silica-based fine particles was adjusted to pH 3.5 with $HNO_3$, and 40 ml of 1-propanol was added. The sol was dried at 110° C. for 16 hours. The residue was ground with a mortar and calcined in a muffle furnace at 500° C. for 1 hour to give a specimen.

The specimen was analyzed on a specific surface area measurement device (model: MULTISORB 12, manufactured by Yuasa Ionics) by a nitrogen adsorption method (a BET method) to determine the amount of nitrogen adsorbed. Based on the adsorption amount, the specific surface area was calculated by a single point BET method. Specifically, 0.5 g of the specimen was placed on a measurement cell and was degassed at 300° C. for 20 minutes in a stream of a gas mixture containing 30 vol % nitrogen and 70 vol % helium. The specimen was then held at a liquid nitrogen temperature in a stream of the gas mixture to equilibrate the nitrogen adsorption on the specimen. Next, under a stream of the gas mixture, the specimen temperature was gradually increased to room temperature and the amount of nitrogen desorbed during this process was determined. The specific surface area ($m^2/g$) of the silica fine particles or the silica-based fine particles was calculated based on a preliminarily constructed calibration curve.

[3] Solid Concentration

The solvent of a sample was removed by treatment including infrared irradiation, and the residue was calcined at 1000° C. for 1 hour to give an ignition residue (a solid). The weight ratio of the ignition residue to the sample was calculated as the solid concentration.

[4] Yellow Index

To 0.05 g, in terms of solid, of a dispersion of inorganic oxide fine particles in water or methanol, a solvent was appropriately added so that the water/methanol ratio (by weight) would be 1/1 and the solid concentration would be 0.5 wt %. Next, the dispersion was mixed together with glycerol so that the weight ratio (weight of dispersion/weight of glycerol) would be ⅓. The mixture was added to a quartz cell 1 mm in depth, 1 cm in width and 5 cm in height. The YI value was measured with a colorimeter/turbidity meter (COH-400 manufactured by NIPPON DENSHOKU INDUSTRIES CO., LTD.).

[5] Particle Composition (Titanium, Tin and Silicon)

An aqueous dispersion of inorganic oxide fine particles was placed into a zirconia bowl, and water was removed by infrared irradiation. $Na_2O_2$ and NaOH were added to the resultant dry residue, and the mixture was heated to give a melt. Further, hydrochloric acid was added to the melt, and pure water as a diluent was added.

The amounts of titanium, tin and silicon in terms of oxide ($TiO_2$, $SnO_2$ and $SiO_2$) in the solution obtained above were measured with use of an ICP apparatus (ICPS-8100 manufactured by Shimadzu Corporation).

(Zirconium and Aluminum)

The aqueous dispersion of inorganic oxide fine particles was placed onto a platinum dish. Hydrofluoric acid and sulfuric acid were added thereto, the mixture was heated, and hydrochloric acid was added thereto, to dissolve the oxide particles. The solution was diluted with pure water and was analyzed on an ICP apparatus (ICPS-8100 manufactured by Shimadzu Corporation) to determine the amounts of zirconium and aluminum in terms of oxide ($ZrO_2$ and $Al_2O_3$)

(Potassium and Sodium)

The aqueous dispersion of inorganic oxide fine particles was placed onto a platinum dish. Hydrofluoric acid and sulfuric acid were added thereto, the mixture was heated, and hydrochloric acid was added thereto, to dissolve the oxide particles. The solution was diluted with pure water and was analyzed on an atomic absorption apparatus (Z-5300 manufactured by Hitachi, Ltd.) to determine the amounts of potassium and sodium in terms of oxide ($K_2O$ and $Na_2O$).

Based on the measurement results, the contents of the components in the inorganic oxide fine particles were calculated.

[6] Crystalline Form of Particles

Approximately 30 mL of an aqueous dispersion of inorganic oxide fine particles (core particles) was placed into a magnetic crucible (model: B-2) and was dried at 110° C. for 12 hours. The residue was added to a desiccator and was cooled to room temperature. Next, the residue was crushed in a mortar for 15 minutes and was analyzed on an X-ray diffractometer (RINT 1400 manufactured by Rigaku Corporation) to identify the crystalline form.

[7] Shape of Particles

The shape of inorganic oxide fine particles was observed with a scanning electron microscope (SEM) (S-5500 manufactured by Hitachi High-Technologies Corporation) at an accelerating voltage of 30 kV. The sample for observation was prepared as follows.

An aqueous dispersion sol of inorganic oxide fine particles was diluted with water to a solid concentration of 0.05%. The diluted dispersion was applied to a collodion-coated metal grid (Okenshoji Co., Ltd.) and was irradiated with a 250 W lamp for 30 minutes to evaporate the solvent. A sample for observation was thus fabricated.

[8] Evaluation of Suppressed Photocatalytic Activity of Inorganic Oxide Fine Particles (Measurement of Color Fading Rate)

To 0.05 g, in terms of solid, of a dispersion of inorganic oxide fine particles in water or methanol, a solvent was appropriately added so that the water/methanol ratio (by weight) would be 1/1 and the solid concentration would be 0.5 wt %. Next, the dispersion was mixed together with a glycerol solution of sunset yellow dye having a solid concentration of 0.02 wt % so that the weight ratio (weight of dispersion/weight of glycerol solution) would be ⅓. The sample thus prepared was added to a quartz cell 1 mm in depth, 1 cm in width and 5 cm in height. Next, a UV lamp (SLUV-6 manufactured by AS ONE) preset to emit a range of wavelengths including i-line wavelength (365 nm) was arranged 5.5 cm away from a 1 cm in width×5 cm in height face of the quartz cell, and the sample was UV irradiated on that face at an intensity of 0.4 mW/cm$^2$ (in terms of 365 nm wavelength) for 3 hours.

The absorbances ($A_0$) and ($A_3$) at 490 nm wavelength of the sample were measured before the UV irradiation or after the UV irradiation, respectively, with an ultraviolet visible light spectrophotometer (V-550 manufactured by JASCO). The color fading rate of the dye was calculated using the following equation.

Color fading rate (%)=$(A_3-A_0)/A_0$×100

[9] Evaluation of Weather Resistance of Thermally Cured Coating Film

The surface of a thermally cured coating film on a substrate was cut with a knife at intervals of 1 mm so as to leave eleven parallel scratches in each of the vertical and horizontal directions. One hundred squares were thus drawn. Next, the coated substrate was subjected to an accelerated exposure test using a xenon weather meter (SX-75 manufactured by Suga Test Instruments Co., Ltd., UV intensity: 60 W/m$^2$, testing conditions in accordance with JIS-K7350-2), and an adhesive cellophane tape was attached to the squares. Next, the adhesive cellophane tape was peeled, and the presence or absence of squares that had been stripped was confirmed. When all the squares remained laminated, the coated substrate was subjected again to the accelerated exposure test, and an adhesive cellophane tape was attached to the squares and peeled therefrom. This cycle was repeated, and the total UV irradiation time to the stripping of one or more squares was determined.

[10] Evaluation of Weather Resistance of Photocured Coating Film

The surface of a photocured coating film on a film was cut with a knife at intervals of 1 mm so as to leave eleven parallel scratches in each of the vertical and horizontal directions. One hundred squares were thus drawn. Next, the coated film was subjected to an accelerated exposure test using a xenon weather meter (SX-75 manufactured by Suga Test Instruments Co., Ltd., UV intensity: 60 W/m$^2$), and an adhesive cellophane tape was attached to the squares. Next, the adhesive cellophane tape was peeled, and the count of the squares that remained laminated on the film was determined.

Another film coated with a photocured coating film was provided and was visually inspected for the degree of cracks on the coating film.

The symbols in Table 4 have the following meanings.
Adhesion
AA: 100 Squares remained laminated.
BB: 99 to 30 Squares remained laminated.
CC: 29 to 0 Squares remained laminated.
Coating Film Appearance
AA: No cracks.
BB: Cracks represented less than 30% of the total area of the coating film.
CC: Cracks represented 30% or more of the total area of the coating film.

[11] Evaluation of Total Light Transmittance and Haze

An aqueous dispersion sol having a solid concentration of 10% was placed into a cell having an optical length of 33 mm. The total light transmittance and the haze were measured with a colorimeter/turbidity meter (COH-400 manufactured by NIPPON DENSHOKU INDUSTRIES CO., LTD.).

[Production of Dispersions of Titanium Oxide Fine Particles]

Example 1

93.665 kg of an aqueous titanium tetrachloride solution (manufactured by OSAKA Titanium technologies Co., Ltd.) containing 7.75 wt % titanium tetrachloride in terms of $TiO_2$ was mixed together with 0.218 kg of an aqueous ferric chloride solution containing 10 wt % ferric chloride (manufactured by Hayashi Pure Chemical Ind., Ltd.) in terms of $Fe_2O_3$. The resultant mixture was mixed together with 36.295 kg of ammonia water (manufactured by UBE INDUSTRIES, LTD.) containing 15 wt % ammonia to give a light yellow brown slurry having a pH of 9.5. Next, the slurry was filtered, and the residue was washed with pure water. Thus, 72.7 kg of an iron-containing hydrous titanic acid cake with a solid concentration of 10 wt % was obtained.

Next, 83.0 kg of an aqueous hydrogen peroxide solution (manufactured by MITSUBISHI GAS CHEMICAL COMPANY, INC.) containing 35 wt % hydrogen peroxide and 411.4 kg of pure water were added to the cake. The mixture was stirred at a temperature of 80° C. for 1 hour, and further 159 kg of pure water was added. Thus, 726 kg of an aqueous iron-containing peroxotitanic acid solution was obtained which contained an iron-containing peroxotitanic acid in an amount of 1 wt % in terms of titanium and iron as $TiO_2$ and $Fe_2O_3$, respectively. The aqueous iron-containing peroxotitanic acid solution was transparent yellow brown, had a pH of 8.5, and had a particle size of the particles in the aqueous solution (in Table 1-1, written as the "peroxotitanic acid particle size") of 35 nm.

Next, 3.5 kg of a cation exchange resin (manufactured by Mitsubishi Chemical Corporation) was admixed to 72.9 kg of the aqueous iron-containing peroxotitanic acid solution. While performing stirring, 9.11 kg of an aqueous potassium stannate solution containing 1 wt % potassium stannate (manufactured by Showa Kako Corporation) in terms of $SnO_2$ was gradually added thereto.

Next, the cation exchange resin which had trapped ions such as potassium ions was separated from the aqueous solution. Thereafter, to the aqueous solution were admixed 18.0 kg of pure water and 1.125 kg of a sol (hereinafter also written as the "silica-based sol 1", pH: 2.2, solid concentration: 16 wt %, manufactured by JGC CATALYSTS AND CHEMICALS LTD.) of silica fine particles (silica-based fine particles) which had a specific surface area of 375 m$^2$/g and contained 0.4 wt % aluminum in terms of $Al_2O_3$. The resultant mixture was heated in an autoclave (manufactured by TAIATSU TECHNO CORPORATION, 120 L) at a temperature of 165° C. for 18 hours.

Next, the sol obtained above was cooled to room temperature and was concentrated with an ultrafiltration membrane apparatus (ACV-3010 manufactured by Asahi Kasei Corporation). Thus, 10.0 kg of an aqueous dispersion sol having a solid concentration of 10 wt % was obtained.

The fine particles contained in the aqueous dispersion sol were iron-containing titanium oxide fine particles which had a rutile crystal structure and contained tin and silicon (hereinafter, the fine particles will be written as the "inorganic oxide fine particles 1A"). The contents of metal components (including silicon, the same applies hereinafter) in the inorganic oxide fine particles 1A were, in terms of oxide, 74.4 wt % $TiO_2$, 9.4 wt % $SnO_2$, 14.3 wt % $SiO_2$, 1.7 wt % $K_2O$, 0.2 wt % $Fe_2O_3$, and 0.05 wt % $Al_2O_3$.

Example 2

The procedures in Example 1 were repeated, except that the amounts of the aqueous titanium tetrachloride solution and the aqueous ferric chloride solution were changed to 93.342 kg and 0.36 kg, respectively. An aqueous dispersion sol was thus obtained which contained iron-containing rutile titanium oxide fine particles having a rutile crystal structure and containing tin and silicon (hereinafter, the fine particles will be written as the "inorganic oxide fine particles 2A").

Example 3

The procedures in Example 1 were repeated, except that the amounts of the aqueous titanium tetrachloride solution and the aqueous ferric chloride solution were changed to 93.006 kg and 0.62 kg, respectively. An aqueous dispersion sol was thus obtained which contained iron-containing titanium oxide fine particles having a rutile crystal structure and containing tin and silicon (hereinafter, the fine particles will be written as the "inorganic oxide fine particles 3A").

Comparative Example 1

The procedures in Example 1 were repeated, except that the amount of the aqueous titanium tetrachloride solution was changed to 93.80 kg and the aqueous ferric chloride solution was not added. An aqueous dispersion sol was thus obtained which contained titanium oxide fine particles having a rutile crystal structure and containing tin and silicon (hereinafter, the fine particles will be written as the "inorganic oxide fine particles 4A").

Comparative Example 2

The procedures in Example 1 were repeated, except that the amounts of the aqueous titanium tetrachloride solution and the aqueous ferric chloride solution were changed to 91.46 kg and 1.82 kg, respectively. An aqueous dispersion sol was thus obtained which contained iron-containing titanium oxide fine particles having a rutile crystal structure and containing tin and silicon (hereinafter, the fine particles will be written as the "inorganic oxide fine particles 5A").

Comparative Example 3

The procedures in Example 1 were repeated, except that the amounts of the aqueous titanium tetrachloride solution and the aqueous ferric chloride solution were changed to 89.116 kg and 3.64 kg, respectively. An aqueous dispersion sol was thus obtained which contained iron-containing titanium oxide fine particles having a rutile crystal structure and containing tin and silicon (hereinafter, the fine particles will be written as the "inorganic oxide fine particles 6A").

Comparative Example 4

100 kg of an aqueous titanium tetrachloride solution (manufactured by OSAKA Titanium technologies Co., Ltd.) containing 2.0 wt % titanium tetrachloride in terms of $TiO_2$ was mixed together with ammonia water (manufactured by UBE INDUSTRIES, LTD.) containing 15 wt % ammonia to give a white slurry having a pH of 8.5. Next, the slurry was filtered, and the residue was washed with pure water. Thus, 20 kg of a hydrous titanic acid cake having a solid concentration of 10 wt % was obtained.

Next, 22.84 kg of an aqueous hydrogen peroxide solution (manufactured by MITSUBISHI GAS CHEMICAL COMPANY, INC.) containing 35 wt % hydrogen peroxide and 57.16 kg of pure water were added to 20 kg of the cake. The mixture was stirred at a temperature of 80° C. for 1 hour. Thus, 100 kg of an aqueous peroxotitanic acid solution was obtained which contained a peroxotitanic acid in an amount of 2 wt % in terms of $TiO_2$. The aqueous peroxotitanic acid solution was transparent yellow brown and had a pH of 8.1.

Next, 29.45 kg of pure water and 465.47 g of a sol (concentration: 16 wt %, manufactured by JGC CATALYSTS AND CHEMICALS LTD.) of silica fine particles (silica-based fine particles) which had a specific surface area of 375 m²/g and contained 0.4% aluminum in terms of $Al_2O_3$ were admixed to 22.5 kg of the aqueous peroxotitanic acid solution. The resultant mixture was heated in an autoclave (manufactured by TAIATSU TECHNO CORPORATION, 120 L) at a temperature of 165° C. for 18 hours.

Next, the sol obtained above was cooled to room temperature and was concentrated with an ultrafiltration membrane apparatus (ACV-3010 manufactured by Asahi Kasei Corporation). Thus, 5.245 kg of an aqueous dispersion sol having a solid concentration of 10 wt % was obtained.

The fine particles contained in the aqueous dispersion sol were titanium oxide fine particles which had an anatase crystal structure and contained silicon (hereinafter, the fine particles will be written as the "inorganic oxide fine particles 7A").

Comparative Example 5

The procedures in Comparative Example 4 were repeated, except that the amount of the aqueous titanium tetrachloride solution was changed to 99.15 kg, and 170 g of an aqueous ferric chloride solution having a concentration of 10% in terms of $Fe_2O_3$ was added thereto. An aqueous dispersion sol was thus obtained which contained iron-containing titanium oxide fine particles having an anatase crystal structure and containing silicon (hereinafter, the fine particles will be written as the "inorganic oxide fine particles 8A").

Example 4

The procedures in Example 3 were repeated, except that the amount of the silica-based sol 1 (manufactured by JGC CATALYSTS AND CHEMICALS LTD.) was changed to 875 g, and the amount of pure water to be mixed with the silica-based sol 1 was changed to 14.0 kg. An aqueous dispersion sol was thus obtained which contained iron-containing titanium oxide fine particles having a rutile crystal structure and containing tin and silicon (hereinafter, the fine particles will be written as the "inorganic oxide fine particles 9A").

Example 5

The procedures in Example 4 were repeated, except that the amounts of the aqueous iron-containing peroxotitanic acid solution, the cation exchange resin and the aqueous potassium stannate solution were changed to 75.18 kg, 3.7 kg and 6.83 kg, respectively. An aqueous dispersion sol was thus obtained which contained iron-containing titanium oxide fine particles having a rutile crystal structure and containing tin and silicon (hereinafter, the fine particles will be written as the "inorganic oxide fine particles 10A").

Example 6

The procedures in Example 3 were repeated, except that the amounts of the aqueous iron-containing peroxotitanic acid solution, the cation exchange resin and the aqueous potassium stannate solution were changed to 77.19 kg, 3.7 kg and 4.82 kg, respectively. An aqueous dispersion sol was thus obtained which contained iron-containing titanium oxide fine particles having a rutile crystal structure and containing tin and silicon (hereinafter, the fine particles will be written as the "inorganic oxide fine particles 11A").

Comparative Example 6

The procedures in Example 3 were repeated, except that the amounts of the aqueous iron-containing peroxotitanic acid solution, the cation exchange resin and the aqueous potassium stannate solution were changed to 65.61 kg, 3.15 kg and 16.4 kg, respectively. An aqueous dispersion sol was thus obtained which contained iron-containing titanium oxide fine particles having a rutile crystal structure and containing tin and silicon (hereinafter, the fine particles will be written as the "inorganic oxide fine particles 12A").

Comparative Example 7

The procedures in Example 3 were repeated, except that the amounts of the aqueous iron-containing peroxotitanic acid solution, the cation exchange resin and the aqueous potassium stannate solution were changed to 78.73 kg, 3.15 kg and 3.78 kg, respectively. An aqueous dispersion sol was thus obtained which contained iron-containing titanium oxide fine particles containing tin and silicon (hereinafter, the fine particles will be written as the "inorganic oxide fine particles 13A"). The crystalline form of the inorganic oxide fine particles 13A was a rutile anatase mixed crystal.

Comparative Example 8

The procedures in Example 1 were repeated, except that the amount of the silica-based sol 1 was changed to 327 g, and the amount of pure water to be mixed with the silica-based sol 1 was changed to 4.9 kg. An aqueous dispersion sol was thus obtained which contained iron-containing rutile titanium oxide fine particles having a rutile crystal structure and containing tin and silicon (hereinafter, the fine particles will be written as the "inorganic oxide fine particles 14A").

Comparative Example 9

The procedures in Example 1 were repeated, except that the amount of the silica-based sol 1 was changed to 1.709 kg, and the amount of pure water to be mixed with the silica-based sol 1 was changed to 27.34 kg. An aqueous dispersion sol was thus obtained which contained iron-containing titanium oxide fine particles having a rutile crystal structure and containing tin and silicon (hereinafter, the fine particles will be written as the "inorganic oxide fine particles 15A").

Example 7

The procedures in Example 1 were repeated, except that the silica-based sol 1 was replaced by a sol (pH: 2.3, concentration: 16 wt %, manufactured by JGC CATALYSTS AND CHEMICALS LTD.) of silica fine particles (i.e. silica-based fine particles) which had a specific surface area of 218 $m^2/g$ and contained 0.4 wt % aluminum in terms of $Al_2O_3$. An aqueous dispersion sol was thus obtained which contained iron-containing titanium oxide fine particles having a rutile crystal structure and containing tin and silicon (hereinafter, the fine particles will be written as the "inorganic oxide fine particles 16A").

Example 8

The procedures in Example 1 were repeated, except that the silica-based sol 1 was replaced by a sol (pH: 2.5, concentration: 16 wt %, manufactured by JGC CATALYSTS AND CHEMICALS LTD.) of silica fine particles (i.e. silica-based fine particles) which had a specific surface area of 530 $m^2/g$ and contained 0.4 wt % aluminum in terms of $Al_2O_3$. An aqueous dispersion sol was thus obtained which contained iron-containing titanium oxide fine particles having a rutile crystal structure and containing tin and silicon (hereinafter, the fine particles will be written as the "inorganic oxide fine particles 17A").

Example 9

The procedures in Example 1 were repeated, except that the silica-based sol 1 was replaced by a sol (pH: 4.0, concentration: 16%, manufactured by JGC CATALYSTS AND CHEMICALS LTD.) of silica fine particles (i.e. silica-based fine particles) which had a specific surface area of 530 $m^2/g$ and contained 15 wt % aluminum in terms of $Al_2O_3$. An aqueous dispersion sol was thus obtained which contained iron-containing titanium oxide fine particles having a rutile crystal structure and containing tin and silicon (hereinafter, the fine particles will be written as the "inorganic oxide fine particles 18A").

Example 10

The procedures in Example 1 were repeated, except that the silica-based sol 1 was replaced by a sol (hereinafter also written as the "silica-based sol 2", pH: 3.2) of silica fine particles (i.e. silica-based fine particles) which had a specific surface area of 263 $m^2/g$ and contained 0.6 wt % zirconium in terms of $ZrO_2$. An aqueous dispersion sol was thus obtained which contained iron-containing titanium oxide fine particles having a rutile crystal structure and containing tin and silicon (hereinafter, the fine particles will be written as the "inorganic oxide fine particles 19A").

Comparative Example 10

The procedures in Example 1 for obtaining an aqueous iron-containing peroxotitanic acid solution were changed so that 166.0 kg of the aqueous hydrogen peroxide solution containing 35% hydrogen peroxide and 328.4 kg of pure water were added to 72.7 kg of the iron-containing hydrous titanic acid cake, the mixture was stirred at 80° C. for 1 hour, and further 159 kg of pure water was added. Thus, 726 kg of an aqueous iron-containing peroxotitanic acid solution was obtained which contained an iron-containing peroxotitanic acid in an amount of 1 wt % in terms of $TiO_2+Fe_2O_3$. The aqueous iron-containing peroxotitanic acid solution was transparent and a little yellow brown, had a pH of 8.5, and had a particle size of the particles in the aqueous solution of 12 nm.

Except that the aqueous iron-containing peroxotitanic acid solution was obtained using the iron-containing hydrous titanic acid cake as described above, the procedures in Example 1 were repeated and 10.0 kg of an aqueous dispersion sol having a solid concentration of 10 wt % was obtained.

The fine particles contained in the aqueous dispersion sol were iron-containing titanium oxide fine particles which had a rutile crystal structure and contained tin and silicon (hereinafter, the fine particles will be written as the "inorganic oxide fine particles 20A").

Comparative Example 11

The procedures in Example 1 for obtaining an aqueous iron-containing peroxotitanic acid solution were changed so that 83.0 kg of the aqueous hydrogen peroxide solution containing 35% hydrogen peroxide and 411.4 kg of pure water were added to 72.7 kg of the iron-containing hydrous titanic acid cake, the mixture was stirred at room temperature for 2.5 hours so as to slowly peptize the iron-containing hydrous titanic acid, thereafter the mixture was stirred at 80° C. for 1 hour, and further 159 kg of pure water was added. Thus, 726 kg of an aqueous iron-containing peroxotitanic acid solution was obtained which contained an iron-containing peroxotitanic acid in an amount of 1 wt % in terms of $TiO_2+Fe_2O_3$. The aqueous iron-containing peroxotitanic acid solution was a little whitened yellow brown, had a pH of 8.5, and had a particle size of the particles in the aqueous solution of 90 nm.

Except that the aqueous iron-containing peroxotitanic acid solution was obtained using the iron-containing hydrous titanic acid cake as described above, the procedures in Example 1 were repeated and 10.0 kg of an aqueous dispersion sol having a solid concentration of 10 wt % was obtained.

The fine particles contained in the aqueous dispersion sol were iron-containing titanium oxide fine particles which had a rutile crystal structure and contained tin and silicon (hereinafter, the fine particles will be written as the "inorganic oxide fine particles 21A").

Comparative Example 12

The procedures in Example 1 for obtaining an aqueous iron-containing peroxotitanic acid solution were changed so that 83.0 kg of the aqueous hydrogen peroxide solution containing 35% hydrogen peroxide and 411.4 kg of pure water were added to 72.7 kg of the iron-containing hydrous titanic acid cake, the mixture was stirred at room temperature for 10 hours and was further stirred at 80° C. for 1 hour, and further 159 kg of pure water was added. Thus, 726 kg of an aqueous iron-containing peroxotitanic acid solution was obtained which contained an iron-containing peroxotitanic acid in an amount of 1 wt % in terms of $TiO_2+Fe_2O_3$. The aqueous iron-containing peroxotitanic acid solution was slightly whitened yellow brown, had a pH of 8.7, and had a particle size of the particles in the aqueous solution of 110 nm.

Except that the aqueous iron-containing peroxotitanic acid solution was obtained using the iron-containing hydrous titanic acid cake as described above, the procedures in Example 1 were repeated and 10.0 kg of an aqueous dispersion sol having a solid concentration of 10 wt % was obtained.

The fine particles contained in the aqueous dispersion sol were iron-containing titanium oxide fine particles which had a rutile crystal structure and contained tin and silicon (hereinafter, the fine particles will be written as the "inorganic oxide fine particles 22A").

Comparative Example 13

The procedures were repeated, except that the silica-based sol 1 was replaced by a sol (pH: 9.2, concentration: 16 wt %, manufactured by JGC CATALYSTS AND CHEMICALS LTD.) of silica fine particles which had a specific surface area of 530 m$^2$/g and contained no aluminum. An aqueous dispersion sol was thus obtained which contained iron-containing titanium oxide fine particles containing tin and silicon (hereinafter, the fine particles will be written as the "inorganic oxide fine particles 23A"). The crystalline form of the inorganic oxide particles 23A was a rutile anatase mixed crystal.

Comparative Example 14

The procedures in Example 1 were repeated, except that the silica-based sol 1 was replaced by a sol (pH: 9.5, concentration: 16 wt %, manufactured by JGC CATALYSTS AND CHEMICALS LTD.) of silica fine particles which had a specific surface area of 218 m$^2$/g and contained no aluminum. An aqueous dispersion sol was thus obtained which contained iron-containing titanium oxide fine particles containing tin and silicon (hereinafter, the fine particles will be written as the "inorganic oxide fine particles 24A"). The crystalline form of the inorganic oxide particles 24A was a rutile anatase mixed crystal.

Comparative Example 15

The procedures in Example 10 were repeated, except that the silica-based sol 2 was replaced by a sol (pH: 4.3, concentration: 16%, manufactured by JGC CATALYSTS AND CHEMICALS LTD.) of silica fine particles (i.e. silica-based fine particles) which had a specific surface area of 530 m$^2$/g and contained 25 wt % aluminum in terms of $Al_2O_3$. An aqueous dispersion sol was thus obtained which contained iron-containing titanium oxide fine particles containing tin and silicon (hereinafter, the fine particles will be written as the "inorganic oxide fine particles 25A"). The crystalline form of the inorganic oxide fine particles 25A was a rutile anatase mixed crystal.

Tables 1-1 to 1-3 describe the raw materials, the characteristics of the inorganic oxide fine particles and of the dispersions, and the evaluation results in Examples 1 to 10 and Comparative Examples 1 to 15.

TABLE 1-1

|  |  |  | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|---|---|
| Inorganic oxide fine particles |  |  | 1A | 2A | 3A | 4A | 5A | 6A | 7A | 8A |
| Raw materials | Mass ratios | $Fe_2O_3/(TiO_2 + Fe_2O_3)$ (%) | 0.3 | 0.5 | 0.85 | 0 | 2.5 | 5 | 0 | 0.85 |
|  |  | $TiO_2/SnO_2$ | 8 | 8 | 8 | 8 | 8 | 8 | — | — |
|  |  | $SiO_2/(TiO_2 + SnO_2 + Fe_2O_3 + SiO_2 + MO_{x/2})$ (%) | 18 | 18 | 18 | 18 | 18 | 18 | 14 | 14 |
|  | Peroxotitanic acid particle size (nm) |  | 35 | 38 | 38 | 42 | 45 | 58 | — | — |
|  | Silica (based) sol | Composition of silica (based) fine particles | $SiO_2/Al_2O_3$ | $SiO_2/Al_2O_3$ | $SiO_2/Al_2O_3$ | $SiO_2/Al_2O_3$ | $SiO_2/Al_2O_3$ | $SiO_2/Al_2O_3$ | $SiO_2/Al_2O_3$ | $SiO_2/Al_2O_3$ |
|  |  | Content (%) of $MO_{x/2}$ in silica (based) fine particles | 0.4 | 0.4 | 0.4 | 0.4 | 0.4 | 0.4 | 0.4 | 0.4 |

TABLE 1-1-continued

|  |  | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|---|
|  | Specific surface area (m²/g) of silica (based) fine particles | 375 | 375 | 375 | 375 | 375 | 375 | 375 | 375 |
| Inorganic oxide fine particles | Crystalline form | Rutile | Rutile | Rutile | Rutile | Rutile | Rutile | Anatase | Anatase |
| | Composition $TiO_2$ (%) | 74.4 | 73.9 | 73.0 | 74.6 | 73.7 | 66.0 | 88.0 | 87.2 |
| | $SiO_2$ (%) | 14.3 | 14.8 | 14.8 | 14.8 | 13.0 | 18.2 | 12.0 | 12.1 |
| | $SnO_2$ (%) | 9.4 | 9.4 | 9.9 | 9.1 | 9.9 | 11.0 | 0.0 | 0.0 |
| | $Fe_2O_3$ (%) | 0.2 | 0.4 | 0.6 | 0.0 | 1.9 | 3.3 | 0.0 | 0.7 |
| | $K_2O$ (%) | 1.7 | 1.5 | 1.7 | 1.4 | 1.5 | 1.5 | 0.0 | 0 |
| | $MO_{x/2}$ (%) | 0.05 | 0.05 | 0.05 | 0.05 | 0.05 | 0.05 | 0.05 | 0.04 |
| | Average particle size (nm) | 16.3 | 18.3 | 18.8 | 17.4 | 20.1 | 27.9 | 17 | 16.1 |
| | Shape | Spindle | Spindle | Spindle | Spindle | Spindle | Spindle | Irregular (anatase particles) | Irregular (anatase particles) |
| Dispersion | Concentration (%) | 10.0 | 10.0 | 10.0 | 10.0 | 10.5 | 9.9 | 10.5 | 10.2 |
| | Total light transmittance (%) | 52.9 | 55.8 | 49.5 | 54.8 | 36.5 | 16.5 | 55.3 | 38.6 |
| | Haze (%) | 11.9 | 7.0 | 11.3 | 9.0 | 9.5 | 14.9 | 8.9 | 13.3 |
| | Yellow index | 0.3 | 0.2 | 0.2 | −0.3 | 0.8 | 1.3 | −0.2 | 0.4 |
| | Color fading rate (%) | −39.0 | −10.7 | −3.9 | −72.2 | −0.7 | −0.3 | −95.0 | −85.0 |

TABLE 1-2

|  |  |  | Ex. 4 | Ex. 5 | Ex. 6 |
|---|---|---|---|---|---|
| Inorganic oxide fine particles |  |  | 9A | 10A | 11A |
| Raw materials | Mass ratios | $Fe_2O_3/(TiO_2 + Fe_2O_3)$ (%) | 0.85 | 0.85 | 0.85 |
| | | $TiO_2/SnO_2$ | 8 | 11 | 16 |
| | | $SiO_2/(TiO_2 + SnO_2 + Fe_2O_3 + SiO_2 + MO_{x/2})$ (%) | 14 | 14 | 18 |
| | Peroxotitanic acid particle size (nm) | | 42 | 41 | 39 |
| | Silica (based) sol | Composition of silica (based) fine particles | $SiO_2/Al_2O_3$ | $SiO_2/Al_2O_3$ | $SiO_2/Al_2O_3$ |
| | | Content (%) of $MO_{x/2}$ in silica (based) fine particles | 0.4 | 0.4 | 0.4 |
| | | Specific surface area (m²/g) of silica (based) fine particles | 375 | 375 | 375 |
| Inorganic oxide fine particles | Crystalline form | | Rutile | Rutile | Rutile |
| | Composition | $TiO_2$ (%) | 75.5 | 78.1 | 79.1 |
| | | $SiO_2$ (%) | 12.1 | 12.3 | 15.0 |
| | | $SnO_2$ (%) | 10.2 | 7.6 | 4.5 |
| | | $Fe_2O_3$ (%) | 0.6 | 0.6 | 0.6 |
| | | $K_2O$ (%) | 1.6 | 1.4 | 0.8 |
| | | $MO_{x/2}$ (%) | 0.04 | 0.04 | 0.05 |
| | Average particle size (nm) | | 18.2 | 18.2 | 20.1 |
| | Shape | | Spindle | Spindle | Spindle |
| Dispersion | Concentration (%) | | 10.0 | 10.0 | 10.1 |
| | Total light transmittance (%) | | 50.3 | 42.1 | 39.3 |
| | Haze (%) | | 10.7 | 14.5 | 14.6 |
| | Yellow index | | 0.2 | 0.3 | 0.3 |
| | Color fading rate (%) | | −3.8 | −3.9 | −3.2 |

|  |  |  | Comp. Ex. 6 | Comp. Ex. 7 | Comp. Ex. 8 | Comp. Ex. 9 |
|---|---|---|---|---|---|---|
| Inorganic oxide fine particles |  |  | 12A | 13A | 14A | 15A |
| Raw materials | Mass ratios | $Fe_2O_3/(TiO_2 + Fe_2O_3)$ (%) | 0.85 | 0.85 | 0.3 | 0.3 |
| | | $TiO_2/SnO_2$ | 4 | 21 | 8 | 8 |
| | | $SiO_2/(TiO_2 + SnO_2 + Fe_2O_3 + SiO_2 + MO_{x/2})$ (%) | 18 | 18 | 6 | 25 |
| | Peroxotitanic acid particle size (nm) | | 39 | 38 | 37 | 35 |

TABLE 1-2-continued

|  |  |  |  |  |  |  |
|---|---|---|---|---|---|---|
|  | Silica (based) sol | Composition of silica (based) fine particles | SiO$_2$/Al$_2$O$_3$ | SiO$_2$/Al$_2$O$_3$ | SiO$_2$/Al$_2$O$_3$ | SiO$_2$/Al$_2$O$_3$ |
|  |  | Content (%) of MO$_{x/2}$ in silica (based) fine particles | 0.4 | 0.4 | 0.4 | 0.4 |
|  |  | Specific surface area (m$^2$/g) of silica (based) fine particles | 375 | 375 | 375 | 375 |
| Inorganic oxide fine particles | Crystalline form |  | Rutile | Rutile/Anatase | Rutile | Rutile |
|  | Composition | TiO$_2$ (%) | 66.9 | 80.6 | 82.1 | 70.8 |
|  |  | SiO$_2$ (%) | 15.1 | 15.0 | 5.4 | 18.1 |
|  |  | SnO$_2$ (%) | 15.7 | 3.2 | 10.7 | 9.4 |
|  |  | Fe$_2$O$_3$ (%) | 0.6 | 0.6 | 0.2 | 0.2 |
|  |  | K$_2$O (%) | 1.7 | 0.6 | 1.6 | 1.4 |
|  |  | MO$_{x/2}$ (%) | 0.05 | 0.05 | 0.02 | 0.08 |
|  | Average particle size (nm) |  | 22.4 | 24.1 | 28.7 | 22.7 |
|  | Shape |  | Rod | Spindle and irregular (approx. 40 nm particle size, anatase particles) | Spindle | Spindle and irregular (10-30 nm particle size, silica-based particles) |
| Dispersion | Concentration (%) |  | 10 | 10 | 10 | 10.3 |
|  | Total light transmittance (%) |  | 59.5 | 6.0 | 20.2 | 11.4 |
|  | Haze (%) |  | 8.6 | 65.3 | 50.7 | 55.8 |
|  | Yellow index |  | 0.6 | 1.6 | 0.6 | 0.3 |
|  | Color fading rate (%) |  | −44.9 | −52.5 | −12.5 | −20.8 |

TABLE 1-3

|  |  |  | Ex. 7 | Ex. 8 | Ex. 9 | Ex. 10 |
|---|---|---|---|---|---|---|
| Inorganic oxide fine particles |  |  | 16A | 17A | 18A | 19A |
| Raw materials | Mass ratios | Fe$_2$O$_3$/(TiO$_2$ + Fe$_2$O$_3$) (%) | 0.3 | 0.3 | 0.3 | 0.3 |
|  |  | TiO$_2$/SnO$_2$ | 8 | 8 | 8 | 8 |
|  |  | SiO$_2$/(TiO$_2$ + SnO$_2$ + Fe$_2$O$_3$ + SiO$_2$ + MO$_{x/2}$) (%) | 18 | 18 | 18 | 18 |
|  | Peroxotitanic acid particle size (nm) |  | 35 | 39 | 39 | 39 |
|  | Silica (based) sol | Composition of silica (based) fine particles | SiO$_2$/Al$_2$O$_3$ | SiO$_2$/Al$_2$O$_3$ | SiO$_2$/Al$_2$O$_3$ | SiO$_2$/ZrO$_2$ |
|  |  | Content (%) of MO$_{x/2}$ in silica (based) fine particles | 0.4 | 0.4 | 15 | 0.6 |
|  |  | Specific surface area (m$^2$/g) of silica (based) fine particles | 218 | 530 | 530 | 263 |
| Inorganic oxide fine particles | Crystalline form |  | Rutile | Rutile | Rutile | Rutile |
|  | Composition | TiO$_2$ (%) | 74.2 | 73.1 | 74.3 | 74.1 |
|  |  | SiO$_2$ (%) | 14.8 | 14.9 | 12.9 | 14.6 |
|  |  | SnO$_2$ (%) | 9.5 | 9.7 | 9.5 | 9.5 |
|  |  | Fe$_2$O$_3$ (%) | 0.2 | 0.6 | 0.2 | 0.2 |
|  |  | K$_2$O (%) | 1.3 | 1.7 | 1.4 | 1.5 |
|  |  | MO$_{x/2}$ (%) | 0.05 | 0.05 | 1.6 | 0.08 |
|  | Average particle size (nm) |  | 17.2 | 18.4 | 19.3 | 18.9 |
|  | Shape |  | Spindle | Spindle | Spindle | Spindle |
| Dispersion | Concentration (%) |  | 10 | 10 | 10 | 10 |
|  | Total light transmittance (%) |  | 54.6 | 50.2 | 48.3 | 49.8 |
|  | Haze (%) |  | 11.2 | 11.5 | 13.4 | 12.4 |
|  | Yellow index |  | 0.2 | 0.2 | 0.3 | 0.2 |
|  | Color fading rate (%) |  | −37.2 | −36.3 | −35.1 | −36.4 |

|  |  |  | Comp. Ex. 10 | Comp. Ex. 11 | Comp. Ex. 12 |
|---|---|---|---|---|---|
| Inorganic oxide fine particles |  |  | 20A | 21A | 22A |
| Raw materials | Mass ratios | Fe$_2$O$_3$/(TiO$_2$ + Fe$_2$O$_3$) (%) | 0.3 | 0.3 | 0.3 |
|  |  | TiO$_2$/SnO$_2$ | 8 | 8 | 8 |
|  |  | SiO$_2$/(TiO$_2$ + SnO$_2$ + Fe$_2$O$_3$ + SiO$_2$ + MO$_{x/2}$) (%) | 18 | 18 | 18 |

TABLE 1-3-continued

|  |  |  |  |  |  |
|---|---|---|---|---|---|
|  | Peroxotitanic acid particle size (nm) |  | 12 | 90 | 110 |
|  | Silica (based) sol | Composition of silica (based) fine particles | SiO$_2$/Al$_2$O$_3$ | SiO$_2$/Al$_2$O$_3$ | SiO$_2$/Al$_2$O$_3$ |
|  |  | Content (%) of MO$_{x/2}$ in silica (based) fine particles | 0.4 | 0.4 | 0.4 |
|  |  | Specific surface area (m$^2$/g) of silica (based) fine particles | 375 | 218 | 375 |
| Inorganic oxide fine particles | Crystalline form |  | Rutile | Rutile | Rutile |
|  | Composition | TiO$_2$ (%) | 74.4 | 74.4 | 74.3 |
|  |  | SiO$_2$ (%) | 14.4 | 14.3 | 14.7 |
|  |  | SnO$_2$ (%) | 9.5 | 9.4 | 9.5 |
|  |  | Fe$_2$O$_3$ (%) | 0.2 | 0.2 | 0.2 |
|  |  | K$_2$O (%) | 1.5 | 1.7 | 1.3 |
|  |  | MO$_{x/2}$ (%) | 0.05 | 0.05 | 0.05 |
|  | Average particle size (nm) |  | 14.6 | 30.2 | 35.1 |
|  | Shape |  | Spindle/irregular (40 nm or larger particle size, rutile particles) | Spindle/irregular (40 nm or larger particle size, rutile particles) | Spindle/irregular (40 nm or larger particle size, rutile particles) |
| Dispersion | Concentration (%) |  | 10 | 10 | 10 |
|  | Total light transmittance (%) |  | 15.6 | 4.2 | 0.7 |
|  | Haze (%) |  | 51.1 | 72.1 | 84.6 |
|  | Yellow index |  | 0.6 | 0.8 | 0.9 |
|  | Color fading rate (%) |  | −39.1 | −42.1 | −49.2 |

|  |  |  | Comp. Ex. 13 | Comp. Ex. 14 | Comp. Ex. 15 |
|---|---|---|---|---|---|
| Inorganic oxide fine particles |  |  | 23A | 24A | 25A |
| Raw materials | Mass ratios | Fe$_2$O$_3$/(TiO$_2$ + Fe$_2$O$_3$) (%) | 0.3 | 0.3 | 0.3 |
|  |  | TiO$_2$/SnO$_2$ | 8 | 8 | 8 |
|  |  | SiO$_2$/(TiO$_2$ + SnO$_2$ + Fe$_2$O$_3$ + SiO$_2$ + MO$_{x/2}$) (%) | 18 | 18 | 18 |
|  | Peroxotitanic acid particle size (nm) |  | 35 | 35 | 36 |
|  | Silica (based) sol | Composition of silica (based) fine particles | SiO$_2$ | SiO$_2$ | SiO$_2$/Al$_2$O$_3$ |
|  |  | Content (%) of MO$_{x/2}$ in silica (based) fine particles | 0 | 0 | 25 |
|  |  | Specific surface area (m$^2$/g) of silica (based) fine particles | 530 | 375 | 530 |
| Inorganic oxide fine particles | Crystalline form |  | Rutile/Anatase | Rutile/Anatase | Rutile/Anatase |
|  | Composition | TiO$_2$ (%) | 74.6 | 74.2 | 74.6 |
|  |  | SiO$_2$ (%) | 14.4 | 14.6 | 11.1 |
|  |  | SnO$_2$ (%) | 9.2 | 9.3 | 9.6 |
|  |  | Fe$_2$O$_3$ (%) | 0.2 | 0.2 | 0.2 |
|  |  | K$_2$O (%) | 1.6 | 1.7 | 1.6 |
|  |  | MO$_{x/2}$ (%) | 0 | 0 | 2.9 |
|  | Average particle size (nm) |  | 16.0 | 22.0 | 41.3 |
|  | Shape |  | Spindle/irregular (40 nm or larger particle size, anatase particles) | Spindle/irregular (40 nm or larger particle size, anatase particles) | Spindle/irregular (40 nm or larger particle size, anatase particles) |
| Dispersion | Concentration (%) |  | 10 | 10 | 10 |
|  | Total light transmittance (%) |  | 13.8 | 14.1 | 0.1 |
|  | Haze (%) |  | 48.9 | 48.7 | 91.3 |
|  | Yellow index |  | 1.0 | 1.0 | 0.7 |
|  | Color fading rate (%) |  | −59.3 | −61.1 | −51.0 |

[Production of Dispersions of Core-Shell Titanium Oxide Fine Particles]

Example 11

(1) Step of Preparing Aqueous Dispersion Sol of Core-Shell Iron-Containing Rutile Titanium Oxide Fine Particles While performing stirring, ammonia water containing 15 wt % ammonia was gradually added to 26.3 kg of an aqueous zirconium oxychloride solution containing 2 wt % zirconium oxychloride (manufactured by TAIYO KOKO CO., LTD.) in terms of $ZrO_2$. A slurry with a pH of 8.5 was thus obtained. Next, the slurry was filtered, and the residue was washed with pure water to give 5.26 kg of a cake containing 10 wt % zirconium component in terms of $ZrO_2$.

Next, 1.80 kg of pure water was added to 200 g of the cake, and the system was rendered alkaline by the addition of 120 g of an aqueous potassium hydroxide solution containing 10 wt % potassium hydroxide (manufactured by KANTO CHEMICAL CO., INC.). Thereafter, 400 g of an aqueous hydrogen peroxide solution containing 35 wt % hydrogen peroxide was added, and the mixture was heated to a temperature of 50° C. to dissolve the cake. Further, 1.48 kg of pure water was added. Thus, 4.0 kg of an aqueous peroxozirconic acid solution containing 0.5 wt % peroxozirconic acid in terms of $ZrO_2$ was obtained. The pH of the aqueous peroxozirconic acid solution was 12.2.

Separately, commercial water glass (manufactured by AGC Si-Tech Co., Ltd.) was diluted with pure water and was dealkalized using a cation exchange resin (manufactured by Mitsubishi Chemical Corporation). Thus, an aqueous silicic acid solution containing 2 wt % silicon component in terms of $SiO_2$ was obtained. The pH of the aqueous silicic acid solution was 2.3.

Next, 12.0 kg of pure water was added to 3.0 kg of the aqueous dispersion sol obtained in Example 1 which contained the inorganic oxide fine particles 1A, and the mixture was stirred to give an aqueous dispersion sol having a solid concentration of 2 wt %. Next, the aqueous dispersion sol was heated to a temperature of 90° C., and 3050 g of the aqueous peroxozirconic acid solution and 2812.5 g of the aqueous silicic acid solution were gradually added thereto. After the completion of the addition, the liquid mixture obtained was aged at a constant temperature of 90° C. for 1 hour while performing stirring.

Next, the aged liquid mixture was placed into an autoclave (manufactured by TAIATSU TECHNO CORPORATION, 50 L) and was heat treated at a temperature of 165° C. for 18 hours.

Next, the liquid mixture was cooled to room temperature and was concentrated using an ultrafiltration membrane apparatus (SIP-1013 manufactured by Asahi Kasei Corporation). Thus, an aqueous dispersion sol 1B having a solid concentration of 20 wt % was obtained.

The fine particles contained in the aqueous dispersion sol 1B were core-shell iron-containing rutile titanium oxide fine particles which were each composed of an iron-containing titanium oxide fine particle (a core particle) having a rutile crystal structure and containing tin and silicon, and a composite oxide containing zirconium and silicon which covered the surface of the fine particle (hereinafter, the core-shell fine particles will be written as the "inorganic oxide fine particles 1B"). The aqueous dispersion sol 1B was transparent and slightly yellow brown.

(2) Step of Preparing Methanol Dispersion Sol Including Core-Shell Iron-Containing Rutile Titanium Oxide Fine Particles While performing stirring, the aqueous dispersion sol 1B obtained in the step (1) was added to a methanol solution of tetraethoxysilane (manufactured by Tama Chemicals Co., Ltd.) as a surface treating agent.

Next, the liquid mixture was heated at a temperature of 50° C. for 6 hours, cooled to room temperature, and passed through an ultrafiltration membrane apparatus to replace water as the dispersion medium by methanol (manufactured by CHUSEI OIL CO., LTD.).

Further, the methanol dispersion obtained was concentrated with an ultrafiltration membrane apparatus (SIP-1013 manufactured by Asahi Kasei Corporation). Thus, a methanol dispersion sol 1Bm was prepared which had a solid concentration of 20 wt % and contained the inorganic oxide fine particles 1B.

The methanol dispersion sol 1Bm was transparent and slightly yellow brown.

Example 12

(1) Step of Preparing Aqueous Dispersion Sol of Core-Shell Iron-Containing Rutile Titanium Oxide Fine Particles The procedures in Example 11 were repeated, except that the aqueous dispersion sol obtained in Example 1 was replaced by the aqueous dispersion sol obtained in Example 3 which contained the inorganic oxide fine particles 3A. Thus, an aqueous dispersion sol 3B was obtained which contained core-shell iron-containing rutile titanium oxide fine particles that were each composed of an iron-containing titanium oxide fine particle (a core particle) having a rutile crystal structure and containing tin and silicon, and a composite oxide containing zirconium and silicon which covered the surface of the fine particle (hereinafter, the core-shell fine particles will be written as the "inorganic oxide fine particles 3B"). The aqueous dispersion sol 3B was transparent yellow brown.

(2) Step of Preparing Methanol Dispersion Sol Including Core-Shell Iron-Containing Rutile Titanium Oxide Fine Particles The procedures in the step (2) in Example 11 were repeated, except that the aqueous dispersion sol 1B was replaced by the aqueous dispersion sol 3B. Thus, a methanol dispersion sol 3Bm was prepared which had a solid concentration of 20 wt % and contained the inorganic oxide fine particles 3B.

The methanol dispersion sol 3Bm was transparent and slightly yellow brown.

Example 13

(1) Step of Preparing Aqueous Dispersion Sol of Core-Shell Iron-Containing Rutile Titanium Oxide Fine Particles 108.2 kg of a 0.3% aqueous solution of NaOH (manufactured by AGC Inc.) in pure water was added to 190 kg of the aqueous dispersion sol obtained in Example 5 which contained the inorganic oxide fine particles 10A, thereby adjusting the pH to approximately 10.5. Thereafter, 283 kg of pure water was added, and the mixture was heated to 90° C. To the heated aqueous dispersion sol, 240 kg of a 2 wt % aqueous silicic acid solution prepared in the same manner as in Example 11 and 202 kg of an aqueous sodium aluminate solution prepared by diluting sodium aluminate (manufactured by Asahi Chemical Co., Ltd.) with pure water to 0.67% in terms of $Al_2O_3$ were added concurrently over a period of 3 hours. Thereafter, the liquid mixture was aged at 90° C. for 1 hour, cooled, and concentrated with an ultrafiltration membrane apparatus (SIP-1013 manufactured by Asahi Kasei Corporation). Thus, an aqueous dispersion sol 10B having a solid concentration of 10 wt % was obtained.

The fine particles contained in the aqueous dispersion sol 10B were core-shell iron-containing rutile titanium oxide fine particles which were each composed of an iron-containing titanium oxide fine particle (a core particle) having a rutile crystal structure and containing tin and silicon, and a composite oxide containing silicon and aluminum which covered the surface of the fine particle (hereinafter, the core-shell fine particles will be written as the "inorganic oxide fine particles 10B"). The aqueous dispersion sol 10B was slightly yellow brown.

(2) Step of Preparing Methanol Dispersion Sol Including Core-Shell Iron-Containing Rutile Titanium Oxide Fine Particles A cation exchange resin (manufactured by Mitsubishi Chemical Corporation) was added to the aqueous dispersion sol 10B until the pH became 5. Thereafter, methanol was added in the same amount as the aqueous dispersion sol, and the mixture was passed through an ultrafiltration membrane apparatus to replace water as the dispersion medium by methanol and to concentrate the sol. Thus, a methanol dispersion sol 10Bm was prepared which had a solid concentration of 20 wt % and contained the inorganic oxide fine particles 10B.

Comparative Example 16

The procedures in the step (1) in Example 11 were repeated, except that the aqueous dispersion sol obtained in Example 1 was replaced by the aqueous dispersion sol obtained in Comparative Example 1 which contained the inorganic oxide fine particles 4A. Thus, an aqueous dispersion sol 4B was obtained which contained core-shell rutile titanium oxide fine particles that were each composed of a titanium oxide fine particle (a core particle) having a rutile crystal structure and containing tin and silicon, and a composite oxide containing zirconium and silicon which covered the surface of the fine particle (hereinafter, the core-shell fine particles will be written as the "inorganic oxide fine particles 4B"). The aqueous dispersion sol 4B was transparent and slightly milky white.

Further, the procedures in the step (2) in Example 11 were repeated, except that the aqueous dispersion sol 1B was replaced by the aqueous dispersion sol 4B. Thus, a methanol dispersion sol 4Bm was prepared which had a solid concentration of 20 wt % and contained the inorganic oxide fine particles 4B.

The methanol dispersion sol 4Bm was transparent and slightly blue.

Comparative Example 17

The procedures in the step (1) in Example 11 were repeated, except that the aqueous dispersion sol obtained in Example 1 was replaced by the aqueous dispersion sol obtained in Comparative Example 5 which contained the inorganic oxide fine particles 8A. Thus, an aqueous dispersion sol 8B was obtained which contained core-shell iron-containing anatase titanium oxide fine particles that were each composed of an iron-containing titanium oxide fine particle (a core particle) having an anatase crystal structure and containing silicon, and a composite oxide containing zirconium and silicon which covered the surface of the fine particle (hereinafter, the core-shell fine particles will be written as the "inorganic oxide fine particles 8B"). The aqueous dispersion sol 8B was transparent and slightly milky white.

Further, the procedures in the step (2) in Example 11 were repeated, except that the aqueous dispersion sol 1B was replaced by the aqueous dispersion sol 8B. Thus, a methanol dispersion sol 8Bm was prepared which had a solid concentration of 20 wt % and contained the inorganic oxide fine particles 8B.

The methanol dispersion sol 8Bm was light yellow brown.

Table 2 describes the characteristics of the inorganic oxide fine particles and of the dispersions, and the evaluation results in Examples 11 to 13 and Comparative Examples 16 and 17.

TABLE 2

| | | Ex. 11 | Ex. 12 | Ex. 13 | Comp. Ex. 16 | Comp. Ex. 17 |
|---|---|---|---|---|---|---|
| Core-shell inorganic oxide fine particles | Inorganic oxide fine particles (core-shell particles) prepared | 1B | 3B | 10B | 4B | 8B |
| | Inorganic oxide fine particles (core particles) used | 1A | 3A | 10A | 4A | 8A |
| | Shell composition $SiO_2$ (%) | 75 | 75 | 75 | 75 | 75 |
| | $ZrO_2$ (%) | 25 | 25 | — | 25 | 25 |
| | $Al_2O_3$ (%) | — | — | 25 | — | — |
| | Amount (parts by mass) of raw materials of coating layer fed per 100 (parts by mass) of core particles | 25 | 25 | 32 | 25 | 25 |
| | Composition $TiO_2$ (%) | 58.7 | 57.8 | 51.1 | 57.7 | 68.8 |
| | $SiO_2$ (%) | 24.3 | 24.9 | 31.2 | 26.2 | 22.3 |
| | $SnO_2$ (%) | 7.5 | 7.7 | 5.0 | 7.7 | 0.0 |
| | $Fe_2O_3$ (%) | 0.2 | 0.5 | 0.4 | 0.0 | 0.6 |
| | $ZrO_2$ (%) | 4.7 | 4.7 | 0.0 | 4.1 | 4.7 |
| | $Al_2O_3$ (%) | 0.0 | 0.0 | 5.7 | 0.0 | 0.0 |
| | $K_2O$ (%) | 4.7 | 4.5 | 0.9 | 4.5 | 3.7 |
| | $Na_2O$ (%) | 0.04 | 0.04 | 5.7 | 0.04 | 0.04 |
| | Average particle size (nm) | 15.4 | 15.1 | 19.4 | 22.7 | 20.0 |
| Methanol dispersion sol | Methanol dispersion sol prepared | 1 Bm | 3 Bm | 10 Bm | 4 Bm | 8 Bm |
| | Type of surface treating agent | TEOS | TEOS | None | TEOS | TEOS |
| | Solid concentration (%) | 20 | 20 | 20 | 20 | 20 |
| | Color fading rate (%) | −0.8 | −0.5 | −0.2 | −3.1 | −3.5 |

[Preparation of Thermally Curable Paint Compositions and Coated Substrates Having a Thermally Cured Coating Film]

Example 14

(1) Preparation of Thermally Curable Paint Composition 24.9 g of methanol (manufactured by CHUSEI OIL CO., LTD.) was added to 166.3 g of γ-glycidoxypropyltrimethoxysilane (manufactured by Momentive Performance Materials Japan Limited Liability Company). While performing stirring, 49.0 g of 0.01 N hydrochloric acid was added dropwise. The mixture was further stirred at room temperature for a whole day and night to hydrolyze the γ-glycidoxypropyltrimethoxysilane.

Next, 662.6 g of the methanol dispersion sol 1Bm, 50.8 g of propylene glycol monomethyl ether (manufactured by Dow Chemical Japan Ltd.), 28.5 g of itaconic acid (manufactured by Kishida Chemical Co., Ltd.), 10.3 g of dicyandiamide (manufactured by Kishida Chemical Co., Ltd.) and 6.7 g of a silicone surfactant (L-7001 manufactured by Dow Corning Toray Co., Ltd.) as a leveling agent were added to the above liquid mixture. The resultant mixture was stirred at room temperature for a whole day and night. Thus, a thermally curable paint composition (hereinafter, written as the "hardcoat paint 1BmH") was prepared.

(2) Pretreatment of Plastic Lens Substrates

As many commercial plastic lens substrates (name of monomer: "MR-7" manufactured by Mitsui Chemicals, Inc.) with 1.67 refractive index as required were provided and were etched by being soaked in a 10 wt % aqueous KOH solution kept at 40° C. for 2 minutes. The substrates were collected, water washed and sufficiently dried.

(3) Preparation of Coated Substrates Having a Thermally Cured Coating Film

The hardcoat paint 1BmH obtained above was applied to the surface of the plastic lens substrates to form coating films. This application of the paint composition was performed by dipping (lift-up rate: 190 mm/min). The coating films were cured by heat treatment at 90° C. for 10 minutes and then at 110° C. for 2 hours. Thus, coated substrates 1BmHF having a thermally cured coating film were obtained.

Example 15

A thermally curable paint composition (hereinafter, written as the "hardcoat paint 3BmH") was prepared and coated substrates 3BmHF having a thermally cured coating film were obtained in the same manner as in Example 14, except that the methanol dispersion sol 1Bm was replaced by the methanol dispersion sol 3Bm.

Example 16

A thermally curable paint composition (hereinafter, written as the "hardcoat paint 10BmH") was prepared and coated substrates 10BmHF having a thermally cured coating film were obtained in the same manner as in Example 14, except that the methanol dispersion sol 1Bm was replaced by the methanol dispersion sol 10Bm.

Comparative Example 18

A thermally curable paint composition (hereinafter, written as the "hardcoat paint 4BmH") was prepared and coated substrates 4BmHF having a thermally cured coating film were obtained in the same manner as in Example 14, except that the methanol dispersion sol 1Bm was replaced by the methanol dispersion sol 4Bm.

Comparative Example 19

A thermally curable paint composition (hereinafter, written as the "hardcoat paint 8BmH") was prepared and coated substrates 8BmHF having a thermally cured coating film were obtained in the same manner as in Example 14, except that the methanol dispersion sol 1Bm was replaced by the methanol dispersion sol 8Bm.

Table 3 describes the results of evaluations of the coated substrates obtained in Examples 14 to 16 and Comparative Examples 18 and 19.

TABLE 3

| | Ex. 14 | Ex. 15 | Ex. 16 | Comp. Ex. 18 | Comp. Ex. 19 |
|---|---|---|---|---|---|
| Methanol dispersion sol used | 1Bm | 3Bm | 10Bm | 4Bm | 8Bm |
| Thermally cured coating film | 1BmHF | 3BmHF | 10BmHF | 4BmHF | 8BmHF |
| Color tone (visual inspection) | Somewhat yellow | Slightly yellow | Slightly yellow | Slightly blue | Slightly yellow |
| Weather resistance (UV irradiation time to coating film stripping) | 260 | 300 | 240 | 140 | 80 |

[Preparation of Photocurable Paint Compositions and Coated Films Having a Photocured Coating Film]

Example 17

(1) Preparation of PGME Dispersion Sol of Core-Shell Iron-Containing Rutile Titanium Oxide Fine Particles 15% Aqueous ammonia solution was added to 400 g of the methanol dispersion sol 1Bm having a solid concentration of 20 wt % so that the ammonia concentration would be 200 ppm. Next, 8 g of 3-methacryloxypropyltrimethoxysilane (KBM-503 manufactured by Shin-Etsu Chemical Co., Ltd.) was added, and the mixture was stirred at 50° C. for 18 hours. Next, 320 g of propylene glycol monomethyl ether (hereinafter, written as "PGME", manufactured by SANKYO KASEI CO., LTD.) was added. The mixture was treated in a rotary evaporator at an elevated temperature under reduced pressure to remove the solvent, the weight reaching 363 g. Thereafter, PGME was further added. Thus, a PGME dispersion sol 1Bp having a solid concentration of 20 wt % was obtained. The viscosity of the PGME dispersion sol 1Bp was 2.7 mPa·s.

(2) Preparation of Photocurable Paint Composition

While performing stirring, 0.57 g of PGME (SANKYO KASEI CO., LTD.), 1.25 g of acetone (Kishida Chemical Co., Ltd.), 0.60 g of DPHA (KAYARAD DPHA manufactured by Nippon Kayaku Co., Ltd.), 0.07 g of 1,6-hexanediol diacrylate (SR-238F manufactured by TOMOE Engineering Co., Ltd.) and 0.04 g of a photocuring catalyst (IRGACURE 184 manufactured by BASF) were admixed to 7.47 g of the PGME dispersion sol 1Bp. Thus, a photocurable paint composition 1BpU was obtained.

(3) Preparation of Coated Films Having Photocured a Coating Film

The photocurable paint composition 1BpU was applied to a 188 μm primer-coated PET film (A4300 manufactured by TOYOBO CO., LTD.) with use of a bar coater (#34). The solvent was removed by heat treatment at 80° C. for 5 minutes. The film was placed into a container, which was then tightly closed and filled with nitrogen. The film was UV irradiated at 600 mJ/cm$^2$ using Heraeus UV-H valve. A coated film 1BpUF having a photocured coating film was thus obtained.

Comparative Example 20

A PGME dispersion sol 4Bp having a solid concentration of 20 wt % (viscosity: 2.5 mPa·s), a photocurable paint composition 4BpU, and a coated film 4BpUF having a photocured coating film were obtained in the same manner as in Example 17, except that the methanol dispersion sol 1Bm was replaced by the methanol dispersion sol 4Bm.

Comparative Example 21

A PGME dispersion sol 8Bp having a solid concentration of 20 wt % (viscosity: 2.8 mPa·s), a photocurable paint composition 8BpU, and a coated film 8BpUF having a photocured coating film were obtained in the same manner as in Example 17, except that the methanol dispersion sol 1Bm was replaced by the methanol dispersion sol 8Bm.

Table 4 describes the results of evaluations of the coated films with a photocured coating film obtained in Example 17 and Comparative Examples 20 and 21.

TABLE 4

|  |  | Ex. 17 | Comp. Ex. 20 | Comp. Ex. 21 |
| --- | --- | --- | --- | --- |
| Photocured coating film |  | 1BpUF | 4BpUF | 8BpUF |
| Weather resistance test: adhesion | After 0 hours | AA | AA | AA |
|  | After 20 hours | AA | AA | AA |
|  | After 40 hours | AA | AA | CC |
|  | After 60 hours | AA | AA | CC |
| Weather resistance test: coating film appearance | After 0 hours | AA | AA | AA |
|  | After 20 hours | AA | AA | AA |
|  | After 40 hours | AA | CC | CC |
|  | After 60 hours | BB | CC | CC |

The invention claimed is:

1. Iron-containing rutile titanium oxide fine particles satisfying requirements (a) to (f) below:
   (a) the fine particles contain not less than 70 mass % of Ti in terms of TiO$_2$, contain Fe and contain Sn, Si and at least one metal element (M) selected from the group consisting of Al, Zr, Sb, Zn, Ni, Ba, Mg and V;
   (b) the mass contents of Fe and Ti in terms of oxide satisfy mass of Fe$_2$O$_3$/(total mass of TiO$_2$ and Fe$_2$O$_3$)=0.001 to 0.010;
   (c) the mass contents of Ti and Sn in terms of oxide satisfy mass of TiO$_2$/mass of SnO$_2$=6 to 18;
   (d) the mass contents of Si and M in terms of oxide satisfy mass of SiO$_2$/mass of MO$_{x/2}$ (x is the valence of M)=99.9/0.1 to 80/20;
   (e) the mass contents of Si and the metal elements in terms of oxide satisfy mass of SiO$_2$/(total mass of TiO$_2$, SnO$_2$, Fe$_2$O$_3$, SiO$_2$ and MO$_{x/2}$ (x is the valence of M))=0.08 to 0.22; and
   (f) the average particle size is 4 to 25 nm.

2. Core-shell iron-containing rutile titanium oxide fine particles each comprising the iron-containing rutile titanium oxide fine particle described in claim 1, and a layer covering the fine particle, the layer comprising an oxide and/or a composite oxide containing Si and at least one metal element selected from the group consisting of Al, Zr and Sb.

3. A paint composition comprising the core-shell iron-containing rutile titanium oxide fine particles described in claim 2, and a matrix component.

4. A coating film obtained by curing the paint composition described in claim 3.

5. A coated substrate comprising a substrate and the coating film described in claim 4 disposed on a surface of the substrate.

* * * * *